United States Patent
Heeter et al.

(10) Patent No.: US 11,560,801 B1
(45) Date of Patent: Jan. 24, 2023

(54) FAN BLADE WITH INTERNAL MAGNETORHEOLOGICAL FLUID DAMPING

(71) Applicants: Rolls-Royce North American Technologies Inc., Indianapolis, IN (US); Rolls-Royce Corporation, Indianapolis, IN (US)

(72) Inventors: Robert W. Heeter, Indianapolis, IN (US); Daniel E. Molnar, Jr., Indianapolis, IN (US); Christopher D. Hall, Indianapolis, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 17/561,632

(22) Filed: Dec. 23, 2021

(51) Int. Cl.
*F01D 5/16* (2006.01)
*F01D 5/18* (2006.01)

(52) U.S. Cl.
CPC ............... *F01D 5/16* (2013.01); *F01D 5/187* (2013.01); *F05D 2260/96* (2013.01); *F05D 2300/507* (2013.01)

(58) Field of Classification Search
CPC ........ F01D 5/16; F01D 5/187; F05D 2260/96; F05D 2300/507
See application file for complete search history.

(56) References Cited

U.S. PATENT DOCUMENTS

| | | |
|---|---|---|
| 2,292,072 A | 8/1942 | Hanna et al. |
| 4,118,147 A | 10/1978 | Ellis |
| 4,460,314 A | 7/1984 | Fuller |
| 5,490,759 A | 2/1996 | Hoffman |
| 5,498,137 A | 3/1996 | El Aini et al. |
| 5,634,771 A | 6/1997 | Howard et al. |
| 5,820,348 A | 10/1998 | Fricke |
| 5,984,056 A | 11/1999 | Agnihotri et al. |
| 6,042,338 A | 3/2000 | Brafford et al. |
| 6,694,856 B1 | 2/2004 | Chen et al. |
| 6,854,959 B2 | 2/2005 | Barb |
| 6,953,108 B2 | 10/2005 | Anderfaas et al. |
| 7,051,849 B2 | 5/2006 | Browne et al. |
| 7,147,437 B2 | 12/2006 | Burdgick et al. |
| 7,278,830 B2 | 10/2007 | Vetters |
| 7,347,664 B2 | 3/2008 | Kayser et al. |
| 7,955,054 B2 | 6/2011 | El-Aini et al. |
| 8,061,997 B2 | 11/2011 | Le Hong et al. |

(Continued)

FOREIGN PATENT DOCUMENTS

WO 2002084114 10/2002

*Primary Examiner* — Eldon T Brockman
(74) *Attorney, Agent, or Firm* — Barnes & Thornburg LLP

(57) ABSTRACT

An airfoil for use in a gas turbine engine is formed to define a cavity formed in the airfoil. The airfoil further includes at least one obstructing member arranged within the cavity and a magnetorheological fluid disposed in the cavity. A viscosity of the magnetorheological fluid increases in response to a magnetic field being generated proximate to the fluid in response to the airfoil experiencing an aeromechanic response or vibrations. As such, the obstruction of the movement of the thicker fluid by the obstructing member dampens the vibrations of the airfoil and reduces negative effects of a dynamic response of the airfoil.

19 Claims, 22 Drawing Sheets

(56) References Cited

U.S. PATENT DOCUMENTS

| | | |
|---|---|---|
| 8,171,632 B2 | 5/2012 | Kuehhorn et al. |
| 8,182,233 B2* | 5/2012 | Goldfinch ............. F04D 29/023 |
| | | 416/97 R |
| 8,376,710 B2 | 2/2013 | Gerber et al. |
| 8,424,656 B2* | 4/2013 | Hiemenz ............... F16F 9/3415 |
| | | 188/267.2 |
| 8,568,088 B2 | 10/2013 | Richter |
| 8,590,966 B2 | 11/2013 | Gaines et al. |
| 9,121,284 B2 | 9/2015 | Pope |
| 9,334,740 B2 | 5/2016 | Kellerer et al. |
| 9,879,551 B2 | 1/2018 | Blaney et al. |
| 9,920,650 B2* | 3/2018 | Hyatt ........................ F16F 7/01 |
| 9,957,824 B2 | 5/2018 | Klinetob et al. |
| 10,012,273 B2 | 7/2018 | Plante et al. |
| 10,316,670 B2 | 6/2019 | Morris et al. |
| 10,371,097 B2 | 8/2019 | Sellinger et al. |
| 10,633,983 B2 | 4/2020 | Barua et al. |
| 10,711,638 B2 | 7/2020 | Amini et al. |
| 10,822,965 B2* | 11/2020 | MacMahon ............... F01D 5/10 |
| 10,823,203 B2 | 11/2020 | Theratil et al. |
| 10,938,328 B2 | 3/2021 | Sellinger et al. |
| 11,002,335 B2 | 5/2021 | Ghosh et al. |
| 2002/0067991 A1 | 6/2002 | Montgomery et al. |
| 2009/0016894 A1 | 1/2009 | Strother |
| 2010/0221521 A1 | 9/2010 | Wagner et al. |
| 2010/0300819 A1* | 12/2010 | Hiemenz ............... F16F 9/3415 |
| | | 188/267.2 |
| 2016/0319845 A1 | 11/2016 | Molnar |
| 2017/0058680 A1 | 3/2017 | Chouhan et al. |
| 2017/0211391 A1 | 7/2017 | Wygant |
| 2018/0009201 A1 | 1/2018 | Sellinger et al. |
| 2019/0292923 A1* | 9/2019 | MacMahon ............... F01D 5/16 |
| 2020/0256198 A1 | 8/2020 | Akturk et al. |
| 2020/0340364 A1 | 10/2020 | Starr et al. |
| 2021/0003032 A1 | 1/2021 | Hall |
| 2021/0062658 A1 | 3/2021 | Place et al. |
| 2021/0123347 A1 | 4/2021 | Molnar, Jr. |

* cited by examiner

FAN BLADE WITH INTERNAL MAGNETORHEOLOGICAL FLUID DAMPING

STATEMENT REGARDING FEDERALLY SPONSORED RESEARCH OR DEVELOPMENT

Embodiments of the present disclosure were made with government support under Contract No. FA865019F2078 awarded by the U.S. Air Force. The government may have certain rights.

FIELD OF THE DISCLOSURE

The present disclosure relates generally to propulsion systems, and more specifically to airfoils for use in propulsion systems.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high-pressure air and is ignited. Products of the combustion reaction in the combustor are directed into the turbine where work is extracted by rows of rotating blades and non-rotating vanes to drive the compressor and, sometimes, an output shaft. Each blade and vane has an airfoil that interacts with gases as they pass through the engine.

Airfoils have natural vibration modes of increasing frequency and complexity of the mode shape. The simplest and lowest frequency modes are typically considered to be the bending modes and the torsion mode. The first bending mode is a motion normal to the working surface of an airfoil in which the entire space of the airfoil moves in the same direction. Subsequent bending modes are similar to the initial bending modes, but with a node line of zero motion somewhere along the span of the airfoil other than the root, so that the upper and lower portions of the airfoil may move in opposite directions. The first torsion mode is a twisting motion around an axis that is parallel to the span of the airfoil, in which the entire space of the airfoil, on either side of the axis moves in the same direction.

Blades and vanes may be subject to destructive vibrations induced by steady or unsteady interaction of the airfoils of those blades and vanes with gases passing through a gas turbine engine. One type of vibration is flutter, which is an aero-elastic instability resulting from interaction of the flow over blades and the natural vibration tendencies. The lowest frequency vibration modes, i.e., the first bending mode and the first torsion mode, are often the vibration modes that are susceptible to flutter. When flutter occurs, the unsteady aerodynamic forces on the blade, due to its vibrational inherent attributes and insufficient mechanical or aerodynamic damping, add energy to the vibration, causing the vibration amplitude to increase. The vibration amplitude can become large enough to cause damage to a blade. Another type of vibration, which may occur in blades or vanes, is known as forced response, which is an aero-elastic response to inlet distortion or wakes from upstream airfoils, struts, or any other flow obstruction. The operable range, in terms of pressure rise and flow rate, of turbomachinery can sometimes be restricted by flutter and forced response phenomena.

SUMMARY

The present disclosure may comprise one or more of the following features and combinations thereof.

An airfoil assembly for use in a gas turbine engine according to the present disclosure includes at least one airfoil and at least one electromagnet. The at least one airfoil includes an airfoil body extending radially outwardly relative to an axis and configured to interact with gases surrounding the airfoil body, the airfoil body having a leading edge, a trailing edge opposite the leading edge, a pressure side, and a suction side opposite the pressure side, the airfoil body formed to define a cavity within the airfoil body, the cavity being defined by a radially outer top surface, a radially inner bottom surface, a first inner side surface, a second inner side surface, a pressure side surface, and a suction side surface the airfoil body including a magnetorheological fluid disposed within the cavity, the at least one airfoil further including at least one obstructing member arranged within the cavity and configured to obstruct movement of the magnetorheological fluid within the cavity.

In some embodiments, the at least one electromagnet is configured to generate a first magnetic field and a second magnetic field different than the first magnetic field, wherein the first magnetic field causes the magnetorheological fluid to have a first viscosity. The second magnetic field causes the magnetorheological fluid to have a second viscosity. The second viscosity is greater than the first viscosity. The at least one electromagnet is configured to generate the second magnetic field in response to the airfoil operating in a first operating condition that causes at least one of an aeromechanical response and vibrations in the airfoil.

In some embodiments, the at least one obstructing member is configured to obstruct movement of the magnetorheological fluid within the cavity in response to the magnetorheological fluid having the second viscosity so as to dampen vibrations of the airfoil and reduce negative effects of a dynamic response of the airfoil.

In some embodiments, the at least one obstructing member includes a plurality of pegs that each extend from the pressure side surface to the suction side surface of the cavity.

In some embodiments, the plurality of pegs includes at least two rows of pegs, each row including at least two pegs, wherein each row of pegs of the at least two rows of pegs extends from the leading edge to the trailing edge in a direction generally perpendicular to the leading edge and the trailing edge, and each row of pegs of the at least two rows of pegs is spaced apart from an adjacent row of pegs in a radially direction.

In some embodiments, the at least one obstructing member includes a plurality of radially extending walls, the plurality of radially extending walls including at least one first wall that extends radially outwardly away from the radially inner bottom surface towards the radially outer top surface of the cavity, the at least one first wall extending partway from the radially inner bottom surface towards the radially outer top surface of the cavity, the plurality of radially extending walls further including at least one second wall that extends radially inwardly away from the radially outer top surface towards the radially inner bottom surface of the cavity, the at least one second wall extending partway from the radially outer top surface towards the radially inner bottom surface of the cavity.

In some embodiments, the at least one first wall extends generally perpendicularly away from the radially inner bottom surface of the cavity and the at least one second wall extends generally perpendicularly away from the radially outer top surface of the cavity, each wall of the at least one first wall and the at least one second wall includes a terminal end, wherein the plurality of radially extending walls alternate between the at least one first wall and the at least one second wall in a direction from the leading edge to the trailing edge, and each wall of the at least one first wall extends radially beyond a terminal end of an adjacent second wall of the at least one second wall.

In some embodiments, the at least one obstructing member includes a plurality of angled walls, the plurality of angled walls including at least one first angled wall that extends away from the first inner side surface of the cavity towards the radially inner bottom surface and the second inner side surface, the at least one first angled wall extending at a first angle relative to the first inner side surface and extending partway from the first inner side surface of the cavity towards the radially inner bottom surface and the second inner side surface, the plurality of angled walls further including at least one second angled wall that extends away from the second inner side surface of the cavity towards the radially outer top surface and the first inner side surface, the at least one second angled wall extending at the first angle relative to the second inner side surface and extending partway from the second inner side surface of the cavity towards the radially outer top surface and the first inner side surface such that each first angled wall is parallel to each second angled wall.

In some embodiments, each angled wall of the at least one first angled wall and the at least one second angled wall includes a terminal end, the plurality of angled walls alternate between the at least one first angled wall and the at least one second angled wall in a direction from the radially inner bottom surface to the radially outer top surface of the cavity, and each angled wall of the at least one first angled wall extends beyond a terminal end of an adjacent second angled wall of the at least one second angled wall.

In some embodiments, the airfoil assembly further includes at least one of (i) a rotor assembly including a wheel configured to rotate about the axis and the at least one airfoil extending radially outward from the wheel, and (ii) a vane assembly including at least one inner platform, at least one outer platform, and the at least one airfoil arranged between the at least one inner platform and the at least one outer platform. The at least one electromagnet is arranged radially outward of the at least one airfoil.

In some embodiments, the airfoil assembly further includes at least one of (i) a rotor assembly including a wheel configured to rotate about the axis and the at least one airfoil extending radially outward from the wheel, and (ii) a vane assembly including at least one inner platform, at least one outer platform, and the at least one airfoil arranged between the at least one inner platform and the at least one outer platform. The at least one electromagnet is arranged radially inward of the at least one airfoil.

In some embodiments, the airfoil assembly further includes at least one sensor configured to determine an operating condition of the airfoil, and a controller operably connected to the at least one sensor and to the at least one electromagnet. In response to the at least one sensor determining that the airfoil is operating in the first operating condition, the controller is configured to instruct the at least one electromagnet to generate the second magnetic field such that the magnetorheological fluid has the second viscosity. In the first operating condition includes at least one of a predetermined speed of rotation of the airfoil, a predetermined speed of forward travel of the airfoil, a predetermined vibration of the airfoil, and a predetermined distortion level of air flow interacting with the airfoil.

A gas turbine engine according to another aspect of the present disclosure includes a first airfoil and at least one electromagnet. The first airfoil includes a first airfoil body extending radially outwardly relative to an axis and configured to interact with gases surrounding the first airfoil body, the first airfoil body having a leading edge, a trailing edge opposite the leading edge, a pressure side, and a suction side opposite the pressure side, the first airfoil body formed to define a first cavity within the first airfoil body, the first airfoil body including a first magnetorheological fluid disposed within the first cavity.

In some embodiments, the at least one electromagnet is configured to generate a first magnetic field and a second magnetic field different than the first magnetic field. The first magnetic field causes the first magnetorheological fluid to have a first viscosity. The second magnetic field causes the first magnetorheological fluid to have a second viscosity. The second viscosity is greater than the first viscosity. The at least one electromagnet is configured to generate the second magnetic field in response to the first airfoil operating in a first operating condition that causes at least one of an aeromechanical response and vibrations in the first airfoil.

In some embodiments, movement within the cavity of the first magnetorheological fluid having the second viscosity dampens vibrations of the first airfoil and reduces negative effects of a dynamic response of the first airfoil.

In some embodiments, the first airfoil further includes at least one first obstructing member arranged within the first cavity, and the at least one first obstructing member is configured to obstruct movement of the first magnetorheological fluid having the second viscosity within the first cavity so as to dampen vibrations of the first airfoil and reduce negative effects of a dynamic response of the first airfoil.

In some embodiments, the gas turbine engine further includes at least one rotor assembly including a wheel and a plurality of the first airfoils, the plurality of the first airfoils arranged circumferentially around the wheel, each first airfoil of the plurality of the first airfoils extending radially outwardly from the wheel relative to the axis. The at least one electromagnet includes at least two electromagnets are arranged within the wheel and are circumferentially spaced apart from each other.

In some embodiments, the gas turbine engine further includes at least one rotor assembly including a wheel and a plurality of the first airfoils, the plurality of the first airfoils arranged circumferentially around the wheel, each first airfoil of the plurality of the first airfoils extending radially outwardly from the wheel relative to the axis, and an outer ring arranged radially outward of the plurality of the first airfoils, wherein the at least one electromagnet includes at least two electromagnets arranged within the outer ring and circumferentially spaced apart from each other.

In some embodiments, the gas turbine engine further includes at least one vane assembly including a plurality of inner platforms, a plurality of outer platforms, and a plurality of the first airfoils configured as vanes in the at least one vane assembly, the plurality of the first airfoils arranged circumferentially around the axis, each first airfoil of the plurality of the first airfoils extending radially outwardly relative to the axis and extending between a respective inner platform and a respective outer platform. The at least one electromagnet includes at least two electromagnets arranged radially outward of the plurality of the first airfoils.

In some embodiments, the gas turbine engine further includes at least one vane assembly including a plurality of inner platforms, a plurality of outer platforms, and a plurality of the first airfoils configured as vanes in the at least one vane assembly, the plurality of the first airfoils arranged circumferentially around the axis, each first airfoil of the plurality of the first airfoils extending radially outwardly relative to the axis and extending between a respective inner platform and a respective outer platform. The at least one electromagnet includes at least two electromagnets arranged radially inward of the plurality of the first airfoils.

In some embodiments, the gas turbine engine further includes a second airfoil circumferentially offset from the first airfoil relative to the axis, the second airfoil including a second airfoil body extending radially outwardly relative to the axis and configured to interact with gases surrounding the second airfoil body, the second airfoil body having a leading edge, a trailing edge opposite the leading edge, a pressure side, and a suction side opposite the pressure side, the second airfoil body formed to define a second cavity within the second airfoil body, the second airfoil body including a second magnetorheological fluid disposed within the second cavity, the second airfoil further including at least one second obstructing member arranged within the second cavity and configured to obstruct movement of the second magnetorheological fluid within the second cavity.

In some embodiments, the first magnetic field causes the second magnetorheological fluid to have a third viscosity, the second magnetic field causes the second magnetorheological fluid to have a fourth viscosity, the fourth viscosity is greater than the third viscosity, the at least one electromagnet is configured to generate the fourth magnetic field in response to the second airfoil operating in the first operating condition that causes at least one of an aeromechanical response and vibrations in the second airfoil, the at least one second obstructing member is configured to obstruct movement of the second magnetorheological fluid within the cavity in response to the second magnetorheological fluid having the fourth viscosity so as to dampen vibrations of the first airfoil and reduce negative effects of a dynamic response of the first airfoil. The at least one first obstructing member is different than the at least one second obstructing member so as to mistune adjacent airfoils of the rotor assembly and mitigate flutter of the airfoils.

In some embodiments, the at least one first obstructing member includes a first plurality of walls and the at least one second obstructing member includes a second plurality of walls, the first plurality of walls extend in a first direction, the second plurality of walls extend in a second direction, and the first direction is different than the second direction.

In some embodiments, the first cavity is filled with a first volume of first magnetorheological fluid and the second cavity is filled with a second volume of second magnetorheological fluid, and the first volume is different than the second volume.

A method according to another aspect of the present disclosure includes providing an airfoil including an airfoil body extending radially outwardly relative to an axis and configured to interact with gases surrounding the airfoil body, the airfoil body having a leading edge, a trailing edge opposite the leading edge, a pressure side, and a suction side opposite the pressure side, forming a cavity within the airfoil body, filling the cavity with a magnetorheological fluid, arranging at least one obstructing member within the cavity that is configured to obstruct movement of the magnetorheological fluid within the cavity, providing at least one electromagnet proximate to the airfoil that is configured to generate a first magnetic field and a second magnetic field different than the first magnetic field, wherein the first magnetic field causes the magnetorheological fluid to have a first viscosity, wherein the second magnetic field causes the magnetorheological fluid to have a second viscosity, wherein the second viscosity is greater than the first viscosity, and generating the second magnetic field via the at least one electromagnet in response to the airfoil operating in a first operating condition that causes at least one of an aeromechanical response and vibrations in the airfoil. The at least one obstructing member is configured to obstruct movement of the magnetorheological fluid within the cavity in response to the magnetorheological fluid having the second viscosity so as to dampen vibrations of the airfoil and reduce negative effects of a dynamic response of the airfoil.

These and other features of the present disclosure will become more apparent from the following description of the illustrative embodiments.

DETAILED DESCRIPTION OF THE DRAWINGS

Figure 1:
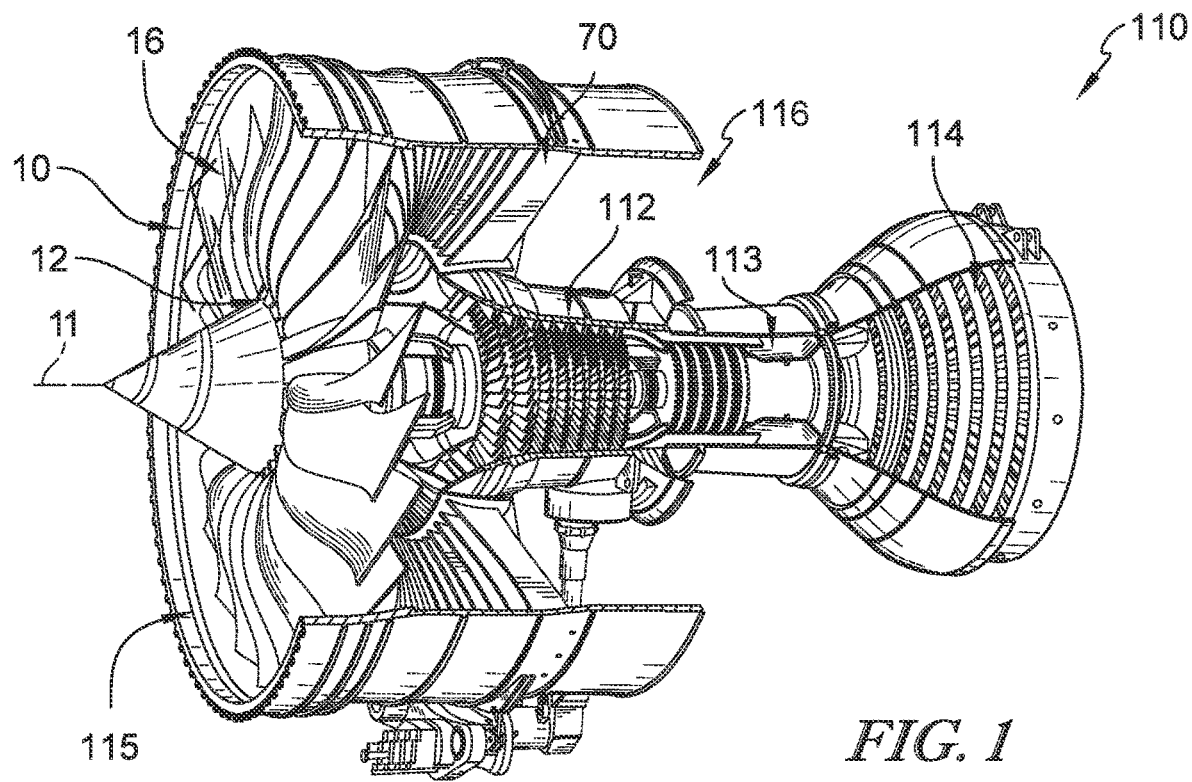
FIG. 1 is a cutaway view of a gas turbine engine that includes a fan, a compressor, a combustor, and a turbine, the fan having a rotor including a wheel arranged around an axis of the engine and a plurality of blades or airfoils arranged around the wheel that each extend radially outward from the wheel to interact with gases flowing through the engine and suggesting that at least some of the airfoils are formed as shown in FIG. 2 to include a cavity formed therein, the cavity having at least one obstruction arranged therein, and showing that the cavity contains a magnetorheological fluid configured to increase in viscosity when a magnetic field is applied such that the thicker fluid moves against the obstruction and the sides of the cavity to damp vibrations of the airfoil or alter a natural frequency of the airfoil, either of which reduces the amplitude of response due to flutter or forced response.

For the purposes of promoting an understanding of the principles of the disclosure, reference will now be made to a number of illustrative embodiments illustrated in the drawings and specific language will be used to describe the same.

A bladed rotor assembly 10 includes a plurality of airfoils 16 formed as blades as shown in FIG. 1. The bladed rotor assembly 10 is adapted for use in a gas turbine engine 110 that includes a compressor 112, a combustor 113, and a turbine 114, and a fan 115 as shown in FIG. 1. The fan 115 is driven by the turbine 114 and provides thrust for propelling an aircraft. The compressor 112 compresses and delivers air to the combustor 112. The combustor 113 mixes fuel with the compressed air received from the compressor 112 and ignites the fuel. The hot, high-pressure products of the combustion reaction in the combustor 113 are directed into the turbine 114 to cause the turbine 114 to rotate about an axis 11 of the gas turbine engine 110 and drive the compressor 113 and the fan 115. In the illustrative embodiment, the fan 115 includes the rotor 10.

The rotor 10 includes a wheel 12 and the plurality of airfoils 16 formed as blades as shown in FIG. 1. The wheel 12 is arranged around the axis 11. The airfoils 16 may each be comprised of a first material and are arranged around the wheel 12. Each airfoil 16 extends radially outwardly away from the wheel 12 relative to the axis 11 to interact with gases surrounding the rotor 10. The first material is a metallic material in the illustrative embodiment. In the illustrative embodiment, the gas turbine engine 110 may further include a vane assembly 70 arranged in the fan exit 116 of the engine 110 as shown in FIG. 1.

Figure 21:
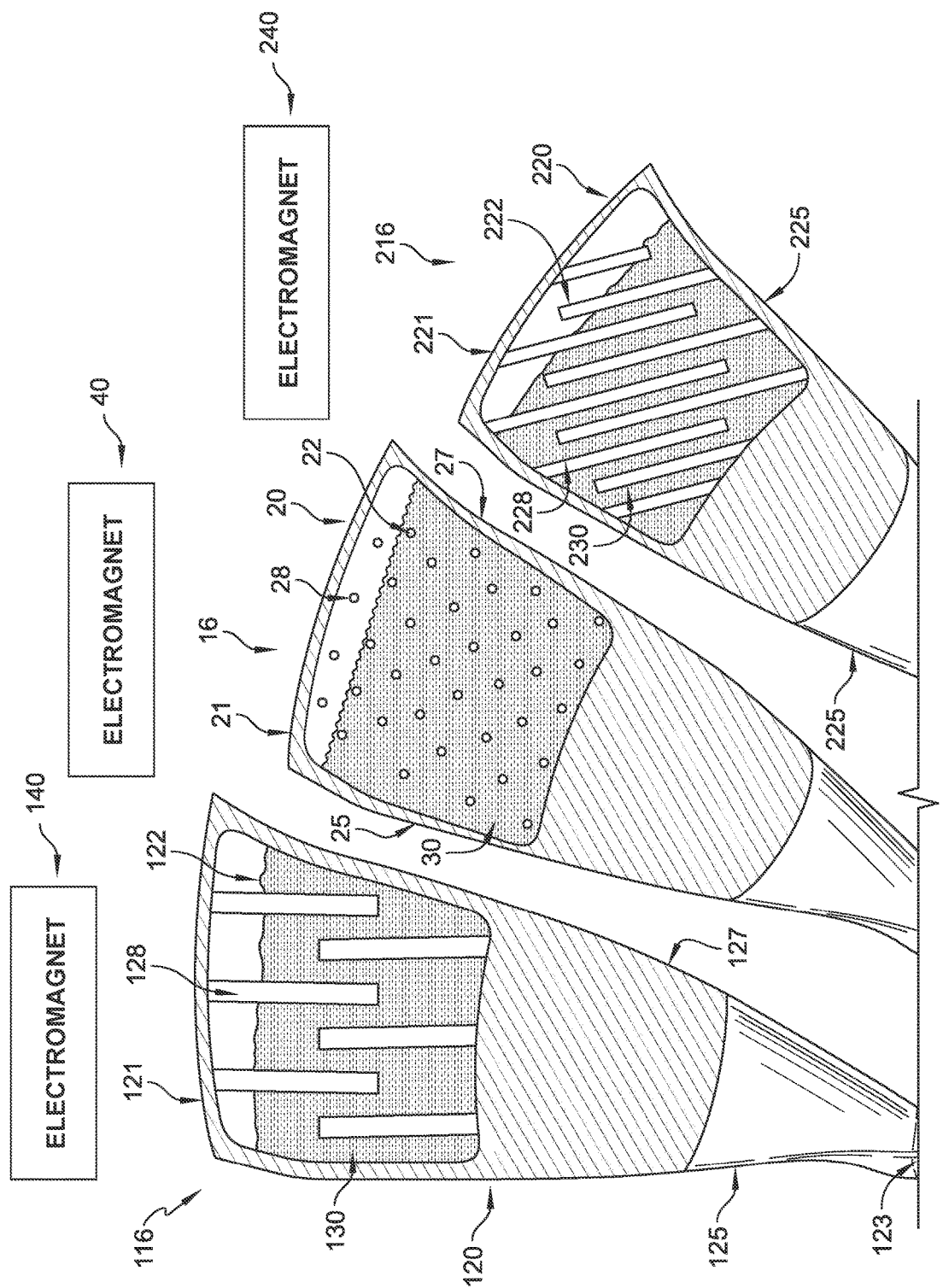
FIG. 21 is a cross-sectional view of a plurality of the airfoils of FIGS. 2, 4, and 6 showing that adjacent airfoils include the same levels of magnetorheological fluid in their respective cavities and different obstructing members arranged in their respective cavities.

The bladed rotor assembly 10 and/or the vane assembly 70 may include one or more of the airfoils 16, 116, 216, 316, 416, 516, 616, 716, 816, 916, 1016, 1116, 1216 described below. In some embodiments, the bladed rotor assembly 10 and/or the vane assembly 70 includes only the airfoils 16. In some embodiments, the bladed rotor assembly 10 and/or the vane assembly 70 may include any combination of groups of airfoils described in alternative embodiments of the airfoils described herein. For example, as shown in FIG. 21, the bladed rotor assembly 10 may include at least one airfoil 16, at least one airfoil 116, and at least one airfoil 216. Each of the airfoils 16, 116, 216, 316, 416, 516, 616, 716, 816, 916, 1016, 1116, 1216 described herein have external surfaces that are similarly sized and shaped for the particular gas turbine engine 110.

Excessive dynamic responses may be a common aerodynamic phenomenon that may lead to excessive vibratory stress and eventual failure in blades and vanes. For example, flutter in blades, intake distortion. Reducing these phenomena may be difficult when combined with other requirements of the airfoils 16, such as structural strength and aerodynamic performance. In some instances, mistuning blades may include changing the existing airfoil shape of some of the blades about the rotor. Yet, such arrangements may cause conflicting issues with the other original blades, such as forced response.

In order to dampen the airfoil vibrations and thus reduce the negative effects of the dynamic response of the airfoil 16, the present disclosure provides for airfoils 16 having similar external shapes and having a cavity 22 formed therein. The cavity 22 includes at least one obstructing member 28 arranged therein that is configured to obstruct movement of a fluid 30 disposed within the cavity 22. In the illustrative embodiments, the fluid 30 may be a magnetorheological fluid which increases in viscosity when in the presence of a magnetic field. At least one electromagnet 40 capable of generating a magnetic field is arranged in close proximity with the airfoil 16 so as to increase the viscosity of the magnetorheological fluid 30 when the magnetic field is generated, The thicker fluid 30 increases the difficultly of the fluid 30 to move past or around the at least one obstructing member 28. This behavior of the fluid 30, as well as the fluid 30 interacting with the inner walls of the cavity 22, dampens the airfoil vibrations and thus reduces the negative effects of the dynamic response of the airfoil 16.

Figure 2:
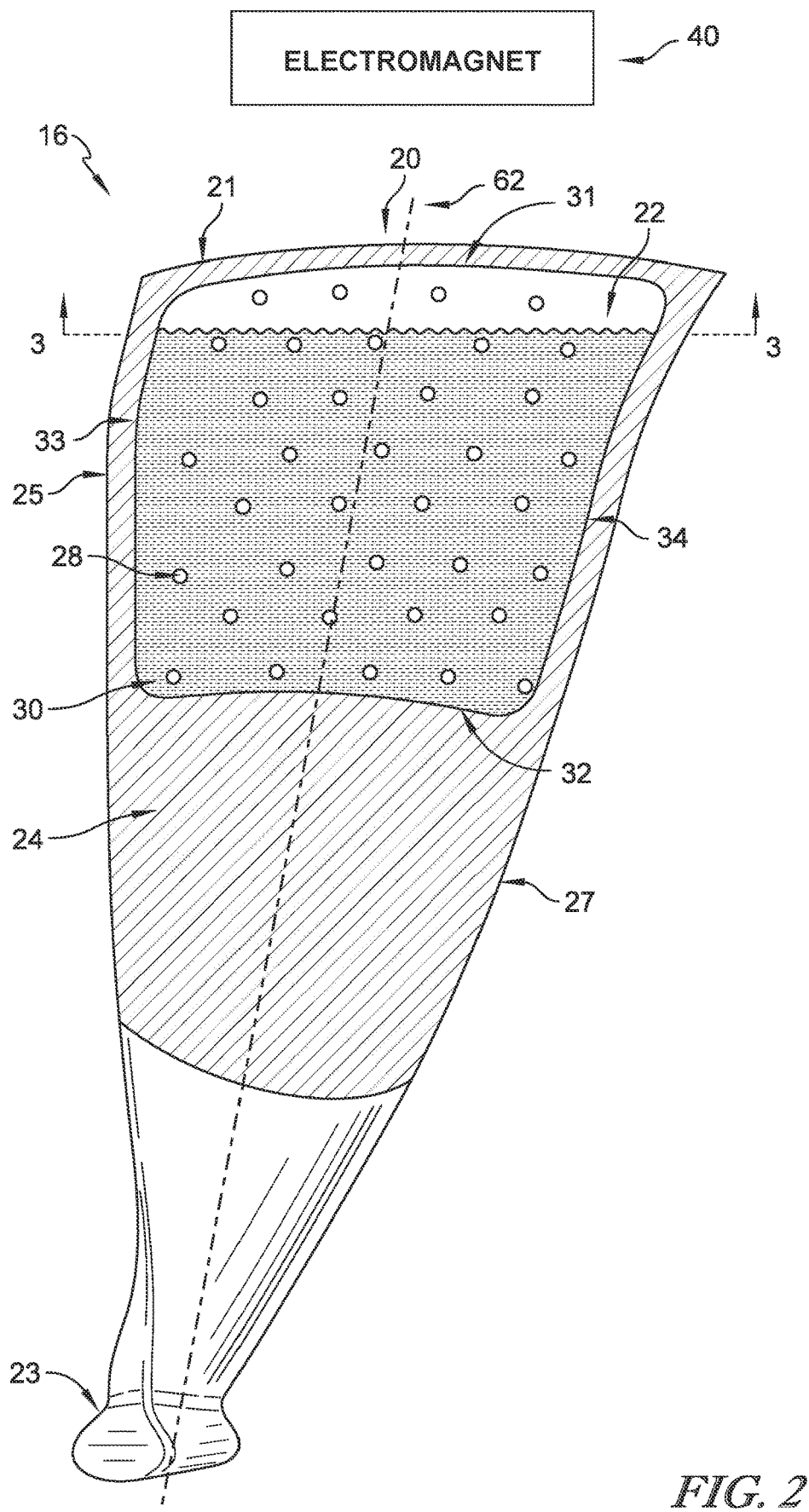
FIG. 2 is a cross-sectional view of one of the airfoils of FIG. 1 showing that the cavity is arranged generally radially outwardly within the airfoil and that the magnetorheological fluid is disposed within the cavity, showing that an electromagnet is arranged in close proximity to the airfoil so as to generate the second magnetic field to the fluid such that the fluid has the second viscosity, and showing that the at least one obstructing member includes a plurality of pegs that each extend from a pressure side surface to the suction side surface of the cavity.

The cavity 22 of the illustrative embodiment is partially filled with the magnetorheological fluid 30 as shown in FIG. 2. The extent to which the cavity 22 is filled with fluid 30 is dependent on the desired damping effect. The remainder of the cavity space may be filled with air or other gas.

Figure 3:
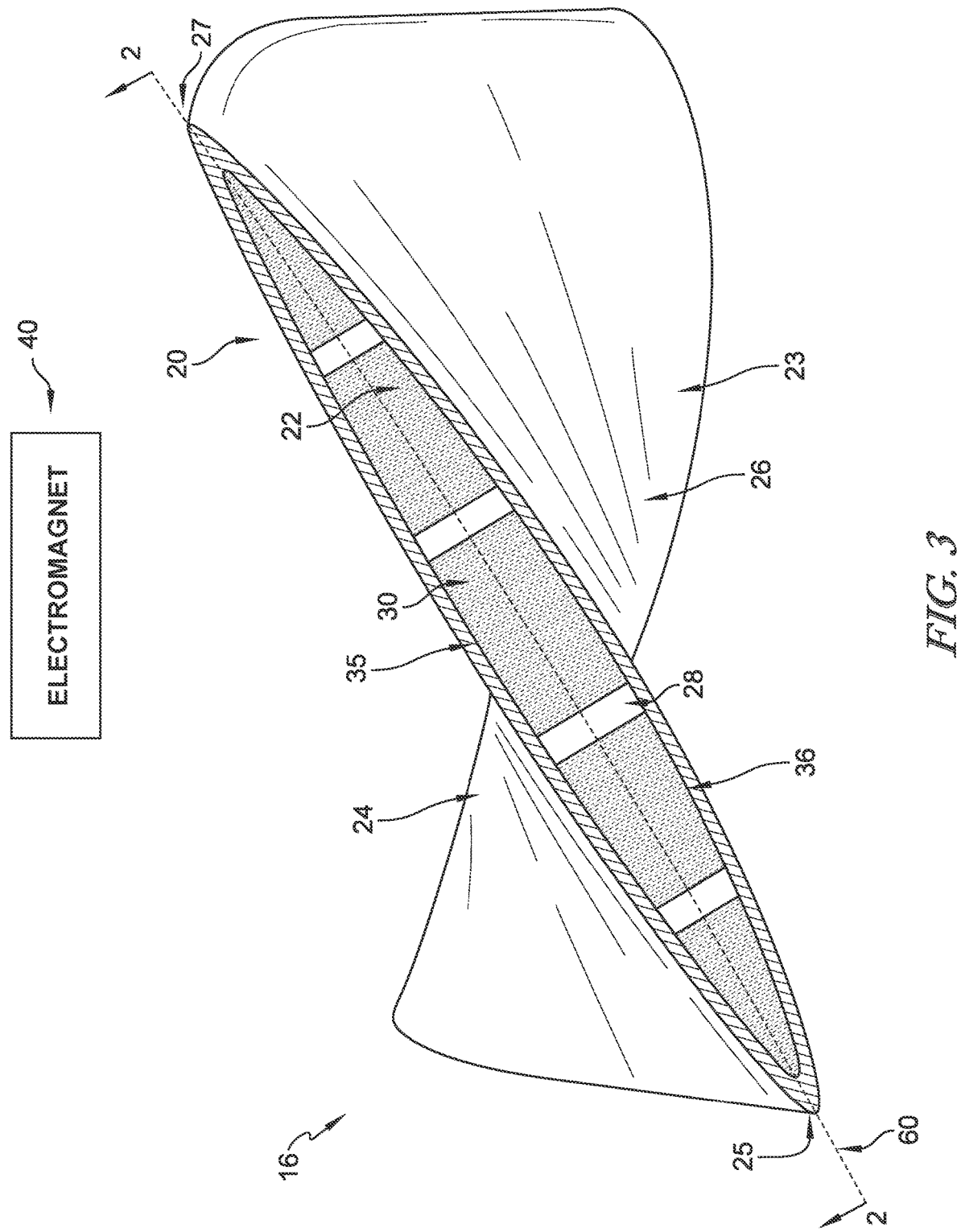
FIG. 3 is a top cross-sectional view of the airfoil of FIG. 2 showing that the plurality of pegs are spaced apart in a direction from the leading edge to the trailing edge of the airfoil and that each peg extends from a pressure side surface to a suction side surface of the cavity.
Figure 16:
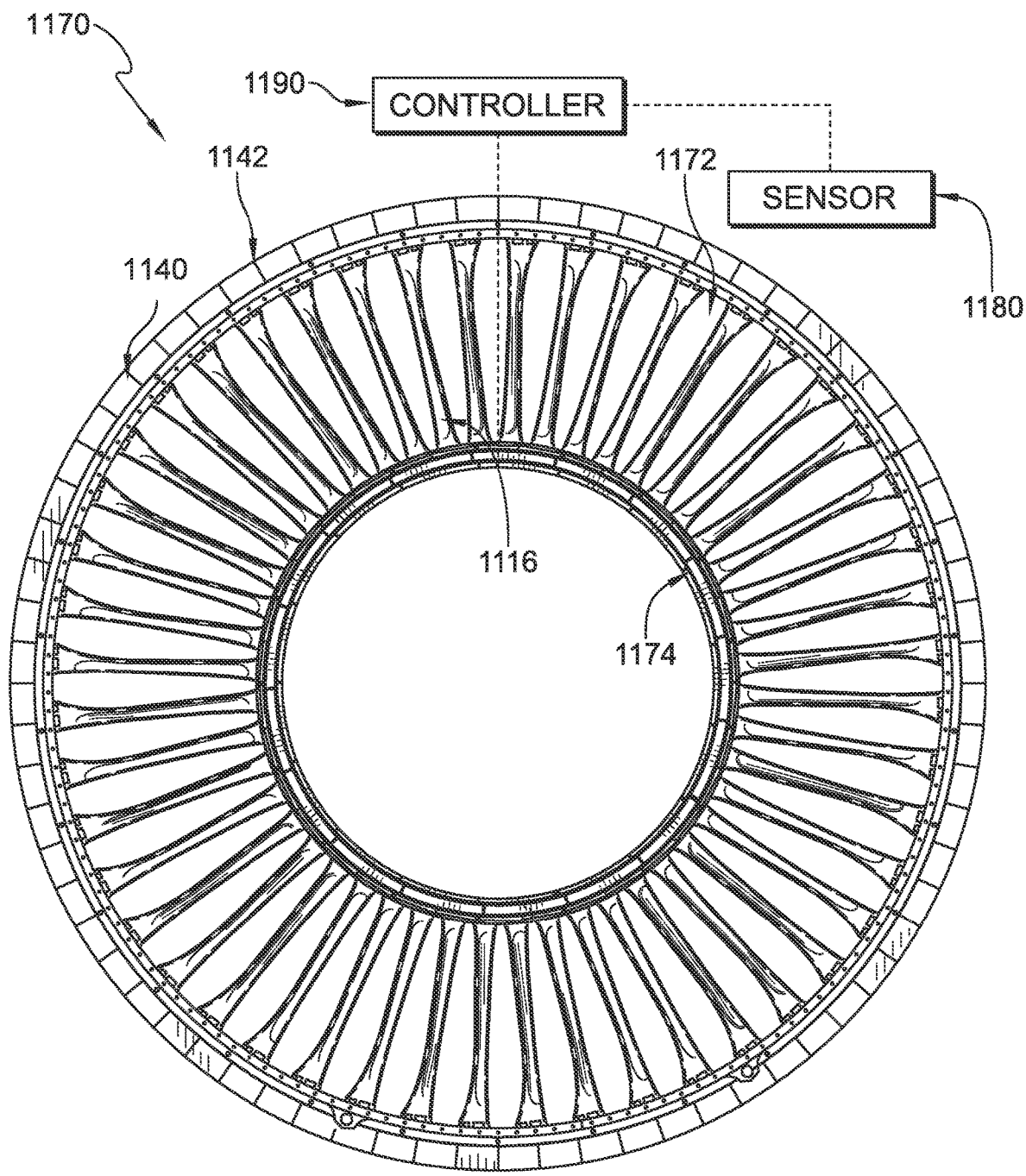
FIG. 16 is a front cross-sectional view of another embodiment according to the present disclosure of a plurality of the airfoils of FIG. 1 showing that the airfoils are arranged circumferentially around a central axis of the gas turbine engine in an outlet guide vane assembly, showing that the assembly includes a sensor and a controller that controls the electromagnets, and showing that the at least one electromagnet includes multiple electromagnets arranged radially outward of the plurality of airfoils.
Figure 17:
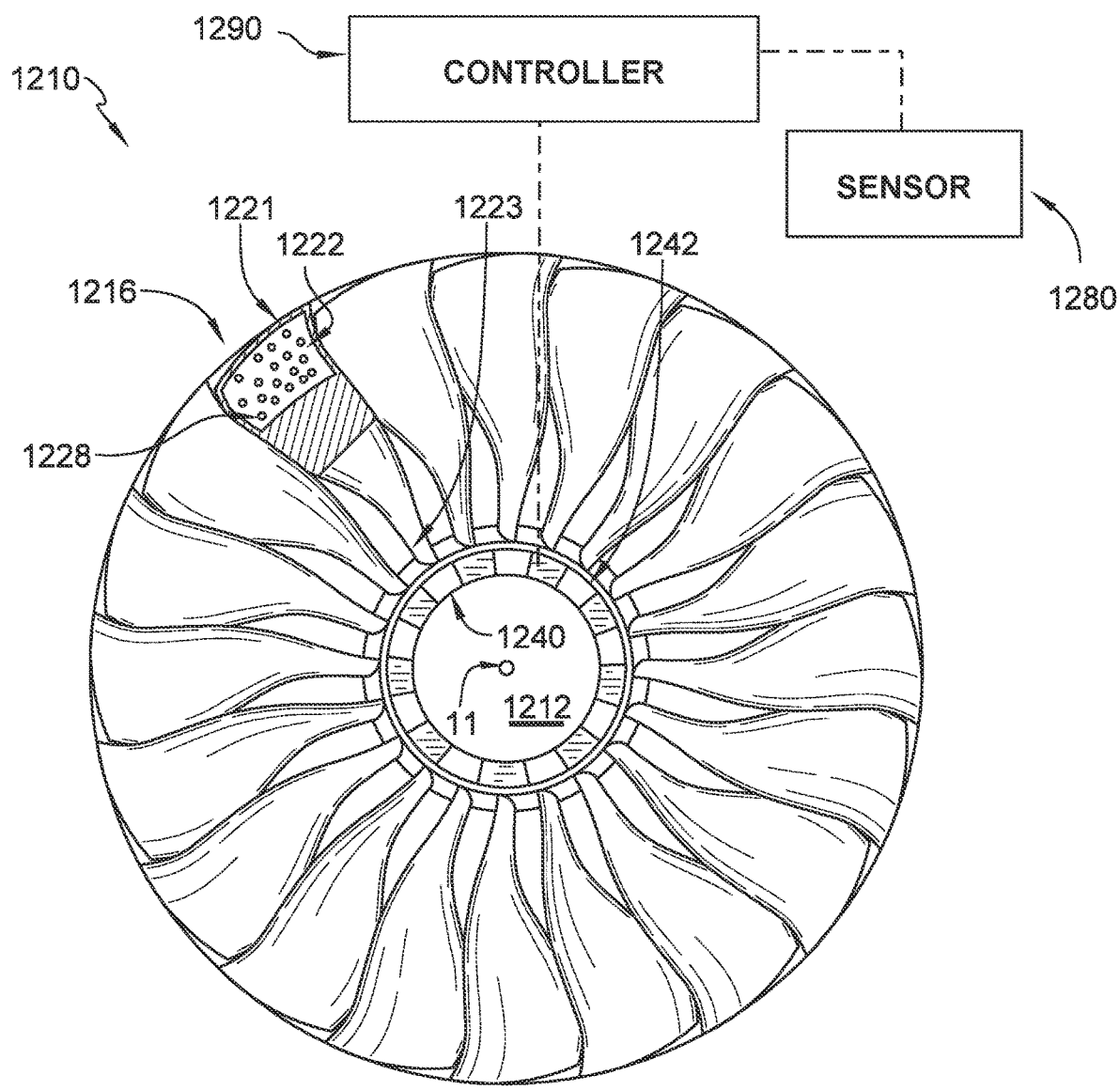
FIG. 17 is a front cross-sectional view of another embodiment according to the present disclosure of a plurality of the airfoils of FIG. 1 showing that the airfoils are arranged circumferentially around a central axis of the gas turbine engine in a rotor assembly as fan blades, showing that the assembly includes a sensor and a controller that controls the electromagnets, showing that the at least one electromagnet includes multiple electromagnets arranged in a wheel of the rotor assembly, radially inward of the plurality of airfoils, and showing that the multiple electromagnets are circumferentially spaced apart from each other.

The airfoil 16 according a first embodiment of the present disclosure includes an airfoil body 20 as shown in FIGS. 2 and 3. The airfoil body 20 has an aerodynamic shape for accelerating air through the gas turbine engine 110. The airfoil body 20 further includes an airfoil tip 21 spaced apart radially outward from an airfoil root 23, the airfoil root 23 located adjacent to the wheel 12, 1212, 1412 in embodiments in which the airfoil 16 is utilized in a bladed rotor assembly 10, fan blisk 1210, as shown in FIG. 17. In embodiments in which the airfoil 16 is utilized in a vane assembly 70, the tip 21 may be located adjacent an outer platform 1172 and the root 23 may be located adjacent an inner platform 1174, as shown in FIG. 16. The airfoil body 20 has a leading edge 25, a trailing edge 27 opposite the leading edge 25, a pressure side external surface 24, and a suction side external surface 26 opposite the pressure side 24 as shown FIGS. 2 and 3.

In the bladed rotor assembly 10 embodiment, the airfoil root 23 of the airfoil 16 is shaped to be received in a corresponding slot in the wheel 12 to couple the airfoil 16 to the wheel 12. In some embodiments, the airfoil root 23 may be another suitable attachment method. In other embodiments, the rotor 10 is a blisk and the plurality of airfoils 16, as well as the additional arrangements of airfoils described herein, are integrally formed with the wheel 12.

The airfoil 16 is formed to include a cavity 22 within the airfoil body 20 as shown in FIGS. 2 and 3. Specifically, the first cavity 22 is located radially outward of the airfoil 16 and adjacent to the tip 21. The cavity 22 is formed as hollowed-out space within the airfoil body 20. In the illustrative embodiment, the cavity 22 is formed generally centrally relative to the pressure side external surface 24, the suction side external surface 26, the leading edge 25, and the trailing edge 27. In some embodiments, the airfoil body 20 may include more than one cavity based on the operating conditions that the airfoil 16 will be experiencing. Moreover, in some embodiments, the cavity 22 may include support walls arranged therein to support the walls of the cavity 22. The cavity 22 is entirely sealed within the airfoil body 20. That is, the cavity 22 is covered entirely by metallic material that forms the airfoil body 20.

The cavity 22 is defined by a radially outer top surface 31, a radially inner bottom surface 32, a first inner side surface 33, a second inner side surface 34, a pressure side inner surface 35, and a suction side inner surface 36 as shown in FIGS. 2 and 3. In the illustrative embodiment, the radially outer top surface 31 is located adjacent the tip 21 and the radially inner bottom surface 22 is located opposite the radially outer top surface 31. As shown in FIG. 2, the radially inner bottom surface 32 is located slightly radially outward of a halfway point of a radial extent of the airfoil 16. The first inner side surface 33 is located adjacent the leading edge 25 of the airfoil 16 and the second inner side surface 34 is located opposite the first inner side surface 33 and adjacent the trailing edge 27 of the airfoil 16. The pressure side inner surface 35 is located adjacent the pressure side external surface 24, and the suction side inner surface 36 is located opposite the pressure side inner surface 35 and adjacent the suction side external surface 26.

It should be understood that the cavity 22 may be sized differently in other embodiments such that the surfaces 31, 33, 34, 35, 36 are not located directly adjacent the tip 21, the leading and trailing edges 27, 25, and the pressure and suction sides 24, 26 of the airfoil 16, respectively. In other words, the cavity 22 may be formed to be volumetrically larger or smaller than the embodiment illustrated in FIGS. 2 and 3 depending on the expected forces acting on the airfoil 16.

The airfoil body 20 further includes the magnetorheological fluid 30 disposed within the cavity 22 as shown in FIGS. 2 and 3. In the illustrative embodiment, the fluid 30 may be a magnetorheological fluid which increases in viscosity when in the presence of a magnetic field. Magnetorheological fluid includes very small particles such as iron suspended in a carrier fluid. When a magnetic field is introduced to the fluid, the small particles are pulled together, thus creating a semi-solid, thicker fluid 30. The viscosity of the fluid 30 may be adjusted by increasing or decreasing the intensity of the magnetic field. For example, as the intensity of the magnetic field increases, the viscosity of the fluid increases. Thus, viscosity levels can be tailored to desired levels based on the operating conditions of the airfoil.

In the illustrative embodiment, the magnetorheological fluid 30 that may be utilized in the embodiments described herein may include ethylene glycol, polyethylene glycol, or oil with iron particles suspended in it. The iron particles may comprise approximately 25% of the mixture. The resulting density would remain approximately 60% that of titanium. Alternates to pure iron could be annealed 17-4 PH, 410 Stainless Steel, or 430 Stainless Steel. These materials are softer than Ti 6-4 with lower yield strengths, and are ferromagnetic and much more common in aerospace applications compared to plain iron. The type of magnetorheological fluid 30 may be selected based on the level of vibration that the airfoil 16 is expected to experience and the amount of damping desired for a particular application.

The thicker fluid 30 moves differently than the thinner fluid 30 and thus the vibratory response of the airfoil 16 is altered based on the thicker fluid 30 interacting with the side walls of the cavity 22 and the at least one obstructing member 28. In this way, vibrations of the airfoil 16 are damped via the movement of the thicker fluid 30 relative to the side walls of the cavity 22 and the obstructing member 28.

At least one electromagnet 40 is arranged within the gas turbine engine 110 in close proximity to the airfoil 16 as shown in FIG. 2. The electromagnet 40 is configured to generate the magnetic field that influences the magnetorheological fluid 30 to increase in viscosity. In particular, the electromagnet 40 is configured to generate a first magnetic field and a second magnetic field different than the first magnetic field. The first magnetic field causes the magnetorheological fluid 30 to have a first viscosity and the second magnetic field causes the magnetorheological fluid 30 to have a second viscosity. The second viscosity is greater than the first viscosity.

In the illustrative embodiment, the at least one electromagnet 40 is configured to generate the second magnetic field in response to the airfoil 16 operating in a first operating condition that causes at least one of an aeromechanical response and vibrations in the airfoil 16. The first operating condition may include a predetermined speed of rotation of the airfoil 16, a predetermined speed of forward travel of the airfoil 16, a predetermined vibration of the airfoil 16, and a predetermined distortion level of air flow interacting with the airfoil 16. As will be described in greater detail below, the electromagnet 40 may be utilized in a bladed rotor assembly 10, 1210, 1410 that includes at least one airfoil 16 and/or a vane assembly 70, 1170, 1370 that includes at least one airfoil 16. In particular, multiple electromagnets 40 may disposed either radially outward of or radially inward of the airfoils 16 in these assemblies.

In other embodiments, the electromagnet 40 may periodically generate the second magnetic field over very short time periods in order to pulse the magnetorheological fluid 30. In this way, the frequency of vibration of the airfoil 16 is altered, or in other words, the airfoil 16 is bumped with offsetting or disruptive frequencies. This operation of the electromagnets may apply to any of the embodiments described herein.

In some embodiments, the airfoil body 20 defines a camber line 60 extending from the leading edge 25 to the trailing edge 27 as shown in FIG. 3. In the illustrative embodiment, the cavity 22 extends beyond the camber line 60 toward the pressure side inner surface 35 and toward the suction side inner surface 36. In other embodiments, the cavity 22 is sized to not extend beyond the camber line 60 based on the particular damping application. For example, in scenarios in which more damping is desired on one side of the camber line 60, the cavity 22 may be formed on that particular side of the camber line 60 within the airfoil 16.

In the illustrative embodiment, the at least one obstructing member 28 includes a plurality of pegs 28 that each extend from the pressure side inner surface 35 to the suction side inner surface 36 of the cavity 22 as shown in FIGS. 2 and 3. The plurality of pegs 28 include multiple rows of pegs 28, each row of pegs 28 extending from the leading edge 25 to the trailing edge 27 in a direction generally perpendicular to the leading edge 25 and the trailing edge 27. In the illustrative embodiment, each row of pegs 28 is spaced apart from adjacent rows of pegs 28 in a radially direction. In the embodiment shown in FIG. 2, each row of pegs 28 includes four or five pegs, and the plurality of pegs 28 includes eight rows of pegs. Moreover, the rows of pegs 28 are staggered such that the pegs of a given row are aligned with the space in between the pegs of an adjacent row. In other embodiments, the number of pegs, the number of rows of pegs, and the staggering of the pegs may be adjusted based on the operating condition of the airfoil 16.

In operation, the airfoil 16 may experience an aeromechanic response and/or vibrations in use, in particular when the airfoil 16 is being utilized as a blade in a bladed rotor assembly 10 or as a vane in a vane assembly 70. When the airfoil 16 vibrates, the electromagnet 40 will generate a magnetic field that causes the magnetorheological fluid 30 to thicken, or in other words the viscosity of the fluid 30 will increase. The thicker, higher viscosity fluid 30 moves differently than the thinner fluid 30 that existed prior to the application of the magnetic field. Specifically, the thicker fluid 30 does not as easily move past and through the obstructing member 28, and thus movement of the fluid 30 is slowed to the desired rate which causes a particular damping effect in the airfoil 16. Thus, vibrations of the airfoil 16 are damped via the movement of the thicker fluid 30 relative to the side walls of the cavity 22 and the obstructing member 28. Moreover, unsynchronized fluid flow relative to the airfoil 16 mode frequency contributes to additional damping.

In the illustrative embodiment, the airfoil 16, which includes the plurality of pegs 28 that extend in a direction from the pressure side 24 to the suction side 26, affect a chord-wise motion of the fluid 30. Because of the hinderance of the chord-wise motion of the fluid 30, the plurality of pegs 28 may provide optimal damping of the airfoil 16 in response to torsion or twisting of the airfoil 16 in the spanwise direction. That is, when the airfoil 16 twists along an axis 62 that extends from the root 23 to the tip 21 of the airfoil 16, the movement of the thickened fluid 30 within the cavity 22 improves the damping of the airfoil 16. Moreover, arrangement of the cavity 22 within the airfoil 16 may be altered such that the cavity 22 is located near a peak displacement for a particular mode or near a peak strain.

In some embodiments, the cavity 22 is located within the airfoil 16 in a location that accommodates specific deflection, bending, and/or torsion of the airfoil 16. Specifically, the cavity 22 may be located in an area of the airfoil 16 in which significant deflection, bending, and/or torsion is occurring. Embodiments may include cavities arranged in other areas of the blade, as well be described herein.

In some embodiments, the frequency and vibratory responses of the airfoil 16 as experienced in response to various operating conditions of the gas turbine engine 110 may be known prior to manufacturing the cavity 22 such that the location of the cavity 22 may established such that a desired damping effect may be achieved based on operating conditions that the gas turbine engine 110 will experience.

Figure 4:
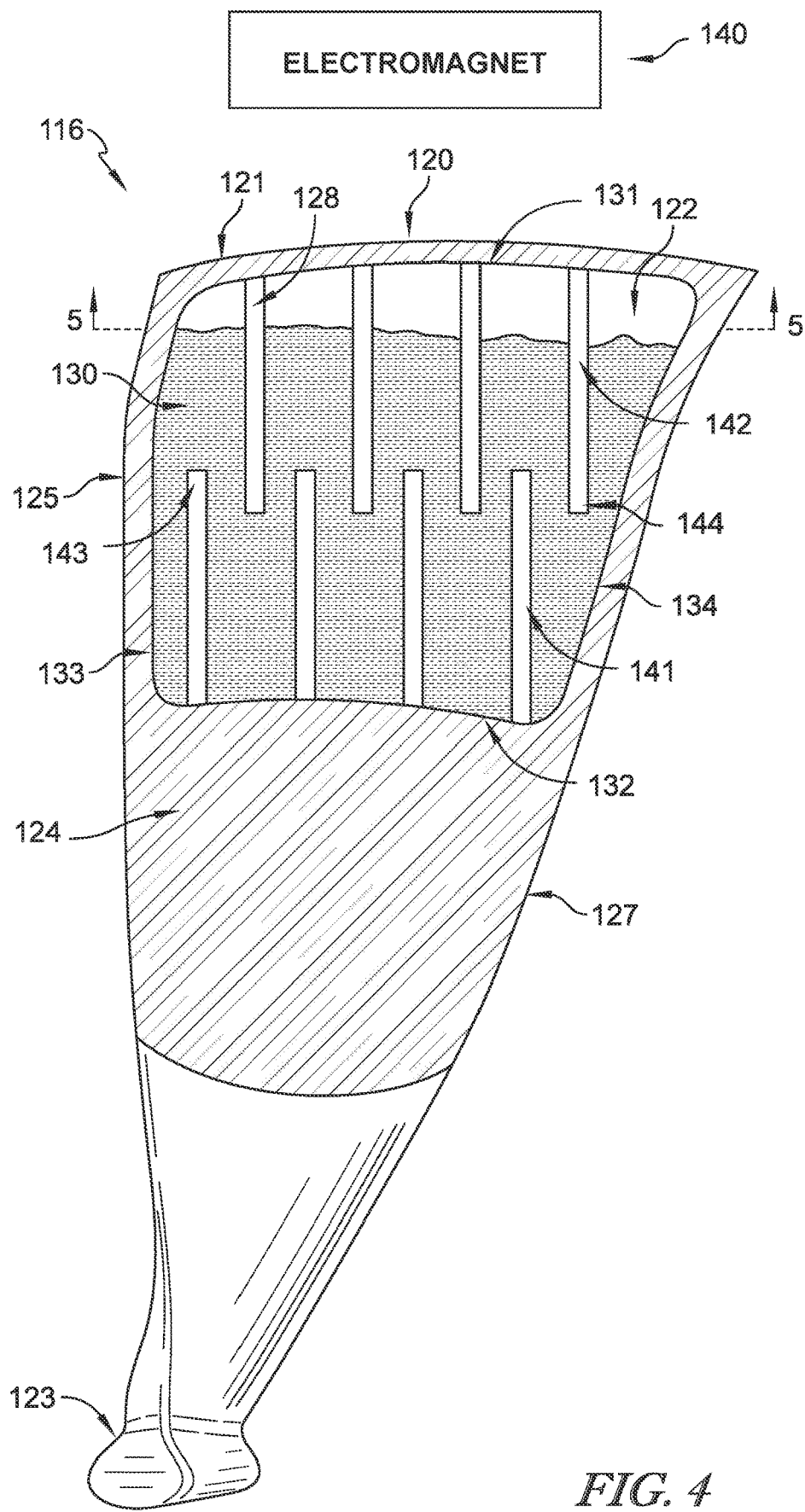
FIG. 4 is a cross-sectional view of another embodiment according to the present disclosure of one of the airfoils of FIG. 1 similar to the airfoils of FIGS. 2 and 3, showing that the at least one obstructing member includes a plurality of radially extending walls, where some of the walls extend from a radially inner bottom surface of the cavity and some of the walls extend from a radially outer top surface of the cavity, and showing that the walls that extend from the bottom surface alternate with the walls that extend from the top surface.
Figure 5:
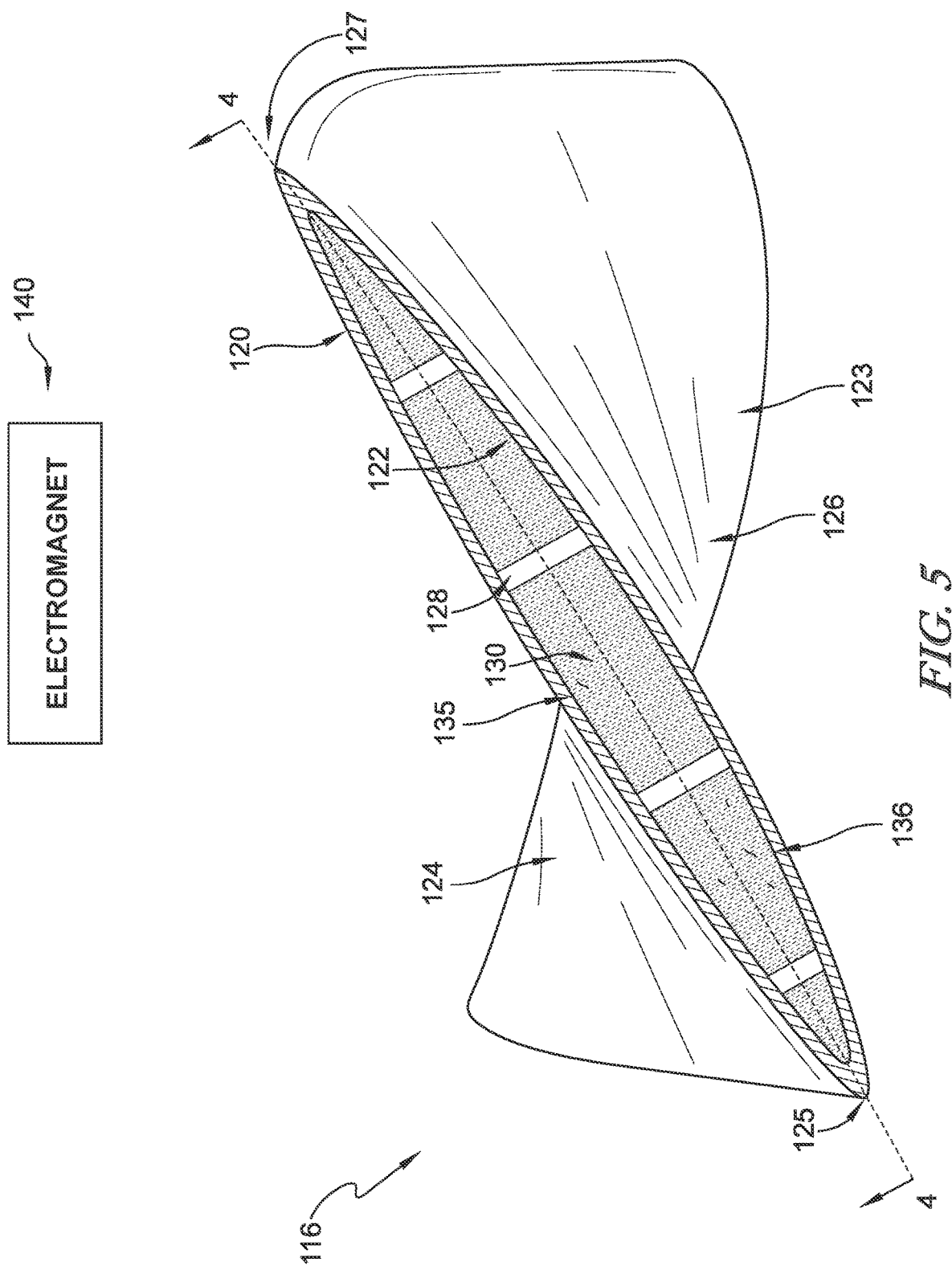
FIG. 5 is a top cross-sectional view of the airfoil of FIG. 4 showing that the plurality of radially extending walls are spaced apart in a direction from the leading edge to the trailing edge of the airfoil and that each wall extends from the pressure side surface to the suction side surface of the cavity.

Another embodiment of an airfoil 116 in accordance with the present disclosure is shown in FIGS. 4 and 5. The airfoil 116 is substantially similar to the airfoil 16 shown in FIGS. 2 and 3 and described herein. Accordingly, similar reference numbers in the 100 series indicate features that are common between the airfoil 116 and the airfoil 16. The description of the airfoil 16 is incorporated by reference to apply to the airfoil 116, except in instances when it conflicts with the specific description and the drawings of the airfoil 116. It should be understood that the airfoil 116 may be utilized in the gas turbine engine 110 similarly to how the airfoil 16 is utilized, in particular in a bladed rotor assembly 10 and/or a vane assembly 70. Moreover, the airfoil 116 may be utilized along with the airfoil 16 within a single assembly 10, 70, or only airfoils 116 may be utilized. Any combination of the airfoils 16, 116 and the airfoils described in further detail below may be utilized in the assemblies 10, 70 as well.

Figure 18:
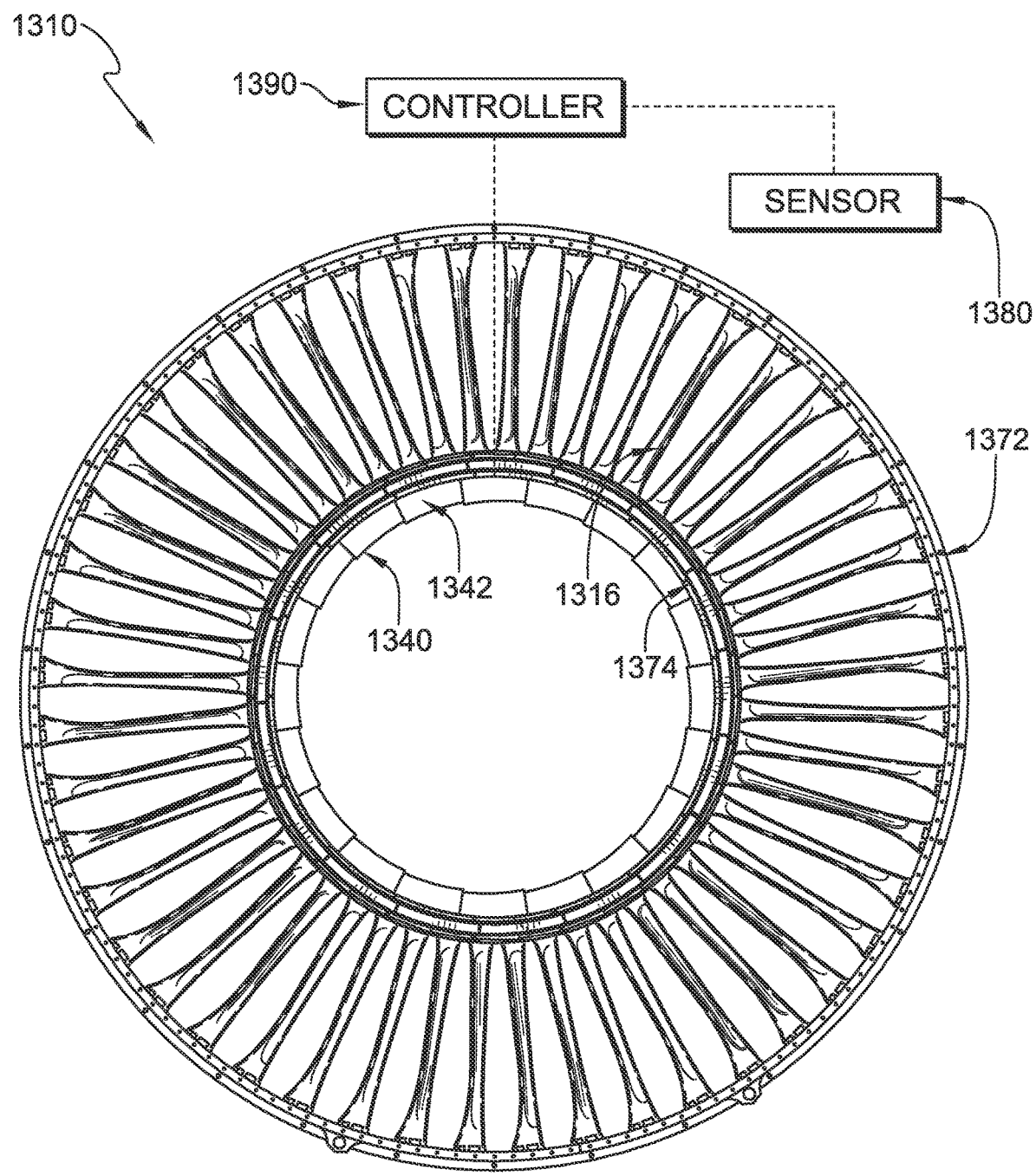
FIG. 18 is a front cross-sectional view of another embodiment according to the present disclosure of a plurality of the airfoils of FIG. 1 showing that the airfoils are arranged circumferentially around a central axis of the gas turbine engine in an outlet guide vane assembly, showing that the assembly includes a sensor and a controller that controls the electromagnets, and showing that the at least one electromagnet includes multiple electromagnets arranged radially inward of the plurality of airfoils.
Figure 19:
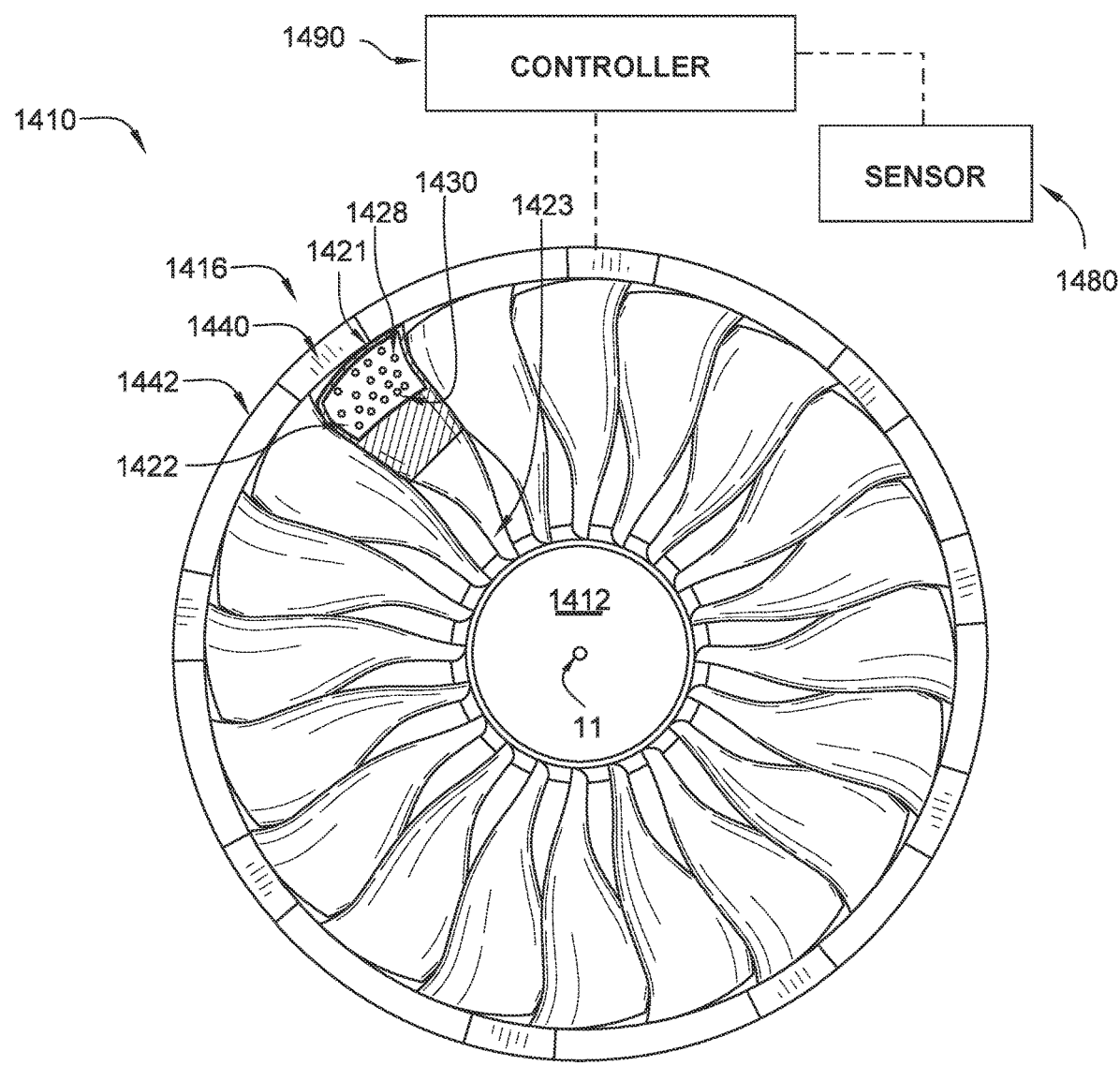
FIG. 19 is a front cross-sectional view of another embodiment according to the present disclosure of a plurality of the airfoils of FIG. 1 showing that the airfoils are arranged circumferentially around a central axis of the gas turbine engine in a rotor assembly as fan blades, showing that the assembly includes a sensor and a controller that controls the electromagnets, showing that the at least one electromagnet includes multiple electromagnets arranged in an outer of the rotor assembly, radially outward of the plurality of airfoils, and showing that the multiple electromagnets are circumferentially spaced apart from each other.

The airfoil 116 is formed similarly to the airfoil 16 described above. In particular, the airfoil 116 includes an airfoil body 120 as shown in FIGS. 4 and 5. The airfoil body 120 includes an airfoil tip 121 spaced apart radially outward from an airfoil root 123, the airfoil root 123 located adjacent to the wheel 12, 1212, 1412 in embodiments in which the airfoil 116 is utilized in a bladed rotor assembly 10, 1210, 1410 as shown in FIGS. 17 and 19. In embodiments in which the airfoil 116 is utilized in a vane assembly 70, 1170, 1370 the tip 121 may be located adjacent an outer platform 1172, 1372 and the root 123 may be located adjacent an inner platform 1174, 1374 as shown in FIGS. 16 and 18. The airfoil body 120 has a leading edge 125, a trailing edge 127 opposite the leading edge 125, a pressure side external surface 124, and a suction side external surface 126 opposite the pressure side 124.

The airfoil 116 is formed to include a cavity 122 within the airfoil body 120 as shown in FIGS. 4 and 5. The cavity 122 is formed as hollowed-out space similar to the cavity 22, being defined by a radially outer top surface 131, a radially inner bottom surface 132, a first inner side surface 133, a second inner side surface 134, a pressure side inner surface 135, and a suction side inner surface 136. The cavity 122 may be formed to be volumetrically larger or smaller than the embodiment illustrated in FIGS. 4 and 5 depending on the expected forces acting on the airfoil 116.

The airfoil body 120 further includes a magnetorheological fluid 130 disposed within the cavity 122 as shown in FIGS. 4 and 5. Similar to the fluid 30 of the airfoil 16, the fluid 130 may be a magnetorheological fluid which increases in viscosity when in the presence of a magnetic field such that, when the magnetic field is introduced after vibrations in the airfoil are detected or when known responses are to be damped, vibrations of the airfoil 116 are damped via the movement of the thicker fluid 130 relative to the side walls of the cavity 122 and the obstructing member 128.

At least one electromagnet 140 is arranged within the gas turbine engine 110 in close proximity to the airfoil 116 as shown in FIG. 4. The electromagnet 140 is configured to generate the magnetic field that influences the magnetorheological fluid 130 to increase in viscosity, similar to the embodiments described above.

In the illustrative embodiment, the at least one obstructing member 128 includes a plurality of radially extending walls 128 as shown in FIGS. 4 and 5. The plurality of radially extending walls 128 includes at least one first wall 141 that extends radially outwardly away from the radially inner bottom surface 132 towards the radially outer top surface 131 of the cavity 122 and at least one second wall 142 that extends radially inwardly away from the radially outer top surface 131 towards the radially inner bottom surface 132 of the cavity 122. The at least one first wall 141 extends partway from the radially inner bottom surface 132 towards the radially outer top surface 131 and the at least one second wall extends partway from the radially outer top surface 131 towards the radially inner bottom surface 132. The walls 141, 142 have a width that extends from the pressure side inner surface 135 to the suction side inner surface 136 as shown in FIG. 5. In the embodiment shown in FIG. 4, the plurality of walls 128 alternate between first walls 141 and second walls 142, and include four first walls 141 and four second walls 142.

In the illustrative embodiment, the first walls 141 extend generally perpendicularly away from the radially inner bottom surface 132 and the second walls 142 extend generally perpendicularly away from the radially outer top surface 131 as shown in FIG. 4. Each wall 141, 142 includes a terminal end 143, 144. In the illustrative embodiment, each first wall 141 extends radially beyond the terminal end 144 of an adjacent second wall 142, and each second wall 142 extends radially beyond the terminal end 143 of an adjacent first wall 141. In other embodiments, the number of walls and the extent of each wall may be adjusted based on the operating condition of the airfoil 116. Similar to the obstructing member 28 described above, the plurality of walls 128 are configured to obstruct movement of the thickened fluid 30 in order to dampen vibrations of the airfoil 116.

Figure 6:
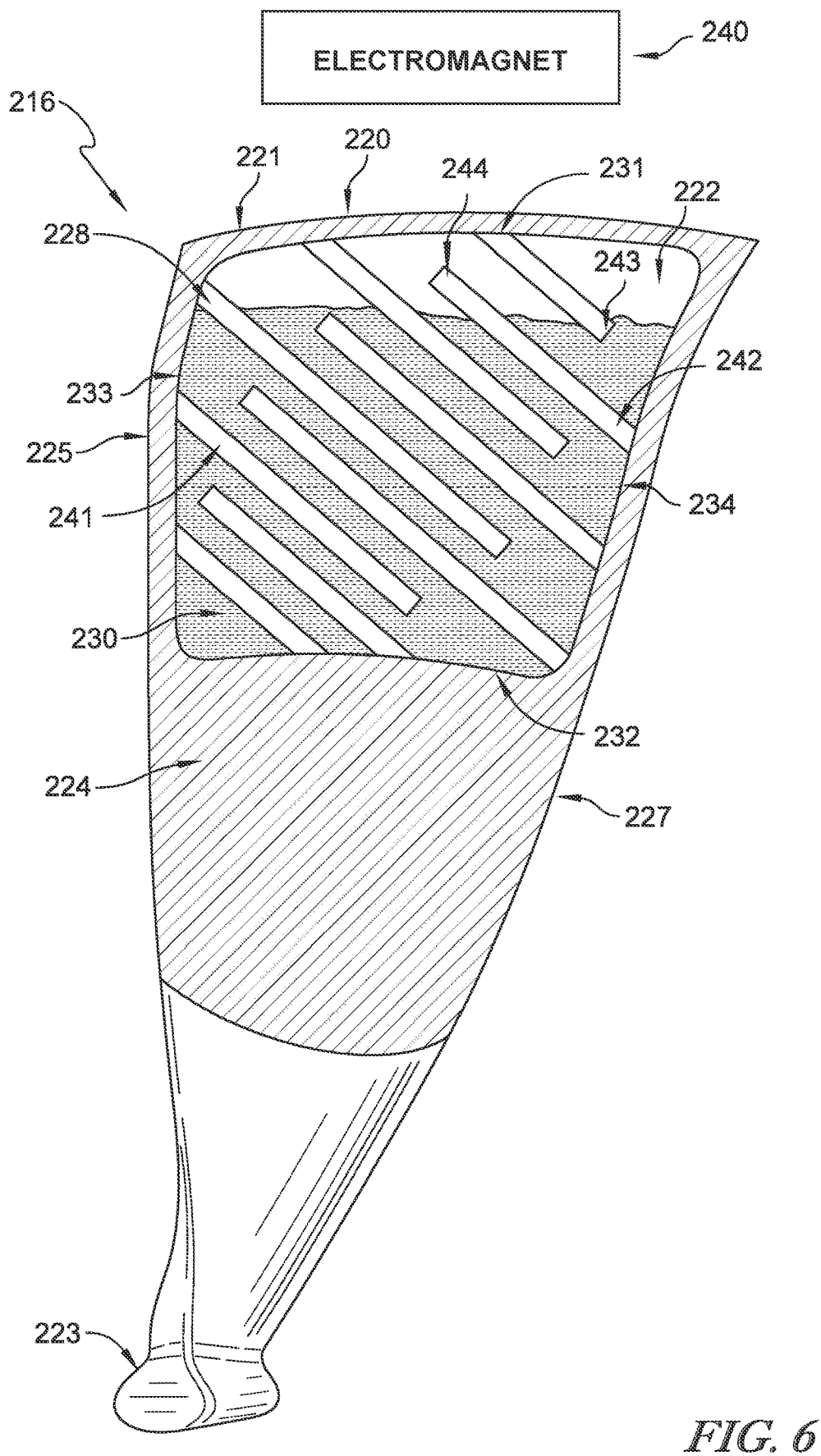
FIG. 6 is a cross-sectional view of another embodiment according to the present disclosure of one of the airfoils of FIG. 1 similar to the airfoils of FIGS. 2-5, showing that the at least one obstructing member includes a plurality of radially extending walls, where some of the walls extend at an angle from a first inner side surface of the cavity near the leading edge of the airfoil and some of the walls extend at an angle from a second inner side surface of the cavity near the trailing edge of the airfoil, and showing that the walls that extend from the first inner side surface alternate with the walls that extend from the second inner side surface.

Another embodiment of an airfoil 216 in accordance with the present disclosure is shown in FIG. 6. The airfoil 216 is substantially similar to the airfoils 16, 116 described herein. Accordingly, similar reference numbers in the 200 series indicate features that are common between the airfoil 216 and the airfoils 16, 116. The descriptions of the airfoils 16, 116 are incorporated by reference to apply to the airfoil 216, except in instances when it conflicts with the specific description and the drawings of the airfoil 216. It should be understood that the airfoil 216 may be utilized in the gas turbine engine 110 similarly to how the airfoils 16, 116 are utilized, in particular in a bladed rotor assembly 10 and/or a vane assembly 70. Moreover, the airfoil 216 may be utilized along with the airfoils 16, 116 within a single assembly 10, 70, or only airfoils 216 may be utilized. Any combination of the airfoils 16, 116, 216 and the airfoils described in further detail below may be utilized in the assemblies 10, 70 as well.

The airfoil 216 is formed similarly to the airfoil 16 described above. In particular, the airfoil 216 includes an airfoil body 220 as shown in FIG. 6. The airfoil body 220 includes an airfoil tip 221 spaced apart radially outward from an airfoil root 223, the airfoil root 223 located adjacent to the wheel 12 in embodiments in which the airfoil 216 is utilized in a bladed rotor assembly 10, as shown in FIG. 17. In embodiments in which the airfoil 216 is utilized in a vane assembly 70, the tip 221 may be located adjacent an outer platform 1172 and the root 223 may be located adjacent an inner platform 1174, as shown in FIG. 16. The airfoil body 220 has a leading edge 225, a trailing edge 227 opposite the leading edge 225, a pressure side external surface 224, and a suction side external surface 226 opposite the pressure side 224.

The airfoil 216 is formed to include a cavity 222 within the airfoil body 220 as shown in FIG. 6. The cavity 222 is formed as hollowed-out space similar to the cavity 22, 122, being defined by a radially outer top surface 231, a radially inner bottom surface 232, a first inner side surface 233, a second inner side surface 234, a pressure side inner surface 235, and a suction side inner surface 236. The cavity 222 may be formed to be volumetrically larger or smaller than the embodiment illustrated in FIG. 6 depending on the expected forces acting on the airfoil 216.

The airfoil body 220 further includes a magnetorheological fluid 230 disposed within the cavity 222 as shown in FIG. 6. Similar to the fluid 30, 130 of the airfoils 16, 116, the fluid 230 may be a magnetorheological fluid which increases in viscosity when in the presence of a magnetic field such that, when the magnetic field is introduced after vibrations in the airfoil are detected or when known responses are to be damped, vibrations of the airfoil 216 are damped via the movement of the thicker fluid 230 relative to the side walls of the cavity 222 and the obstructing member 228.

At least one electromagnet 240 is arranged within the gas turbine engine 110 in close proximity to the airfoil 216 as shown in FIG. 6. The electromagnet 240 is configured to generate the magnetic field that influences the magnetorheological fluid 230 to increase in viscosity, similar to the embodiments described above.

In the illustrative embodiment, the at least one obstructing member 228 includes a plurality of angled walls 228 as shown in FIG. 6. The plurality of angled walls 228 include at least one first angled wall 241 that extends away from the first inner side surface 233 towards the radially inner bottom surface 232 and the second inner side surface 234, and at least one second angled wall 242 that extends away from the second inner side surface 234 towards the radially outer top surface 231 and the first inner side surface 233. The at least one first angled wall 241 extends at a first angle relative to the first inner side surface 233 and extends partway from the first inner side surface 233 towards the radially inner bottom surface 232 and the second inner side surface 234. Similarly, the at least one second angled wall 242 extends at the first angle 245 relative to the first inner side surface 233 and extends partway from the second inner side surface 234 towards the radially outer top surface 231 and the first inner side surface 233. In the illustrative embodiment, each first angled wall 241 is parallel to each second angled wall 242.

In the illustrative embodiment, the plurality of walls 228 includes four first angled walls 241 and four second angled walls 242. Each angled wall 241, 242 includes a terminal end 243, 244. The plurality of angled walls 228 alternate between the first angled walls 241 and the second angled walls 242 in a direction from the radially inner bottom surface 232 to the radially outer top surface 231. In the illustrative embodiment, each first angled wall 241 extends beyond the terminal end 244 of an adjacent second angled wall 242, and each second angled wall 242 extends radially beyond the terminal end 243 of an adjacent first angled wall 241. In other embodiments, the number of walls and the extent of each wall may be adjusted based on the operating condition of the airfoil 216. Similar to the obstructing member 28, 128 described above, the plurality of walls 228 are configured to obstruct movement of the thickened fluid 230 in order to dampen vibrations of the airfoil 216.

Figure 7:
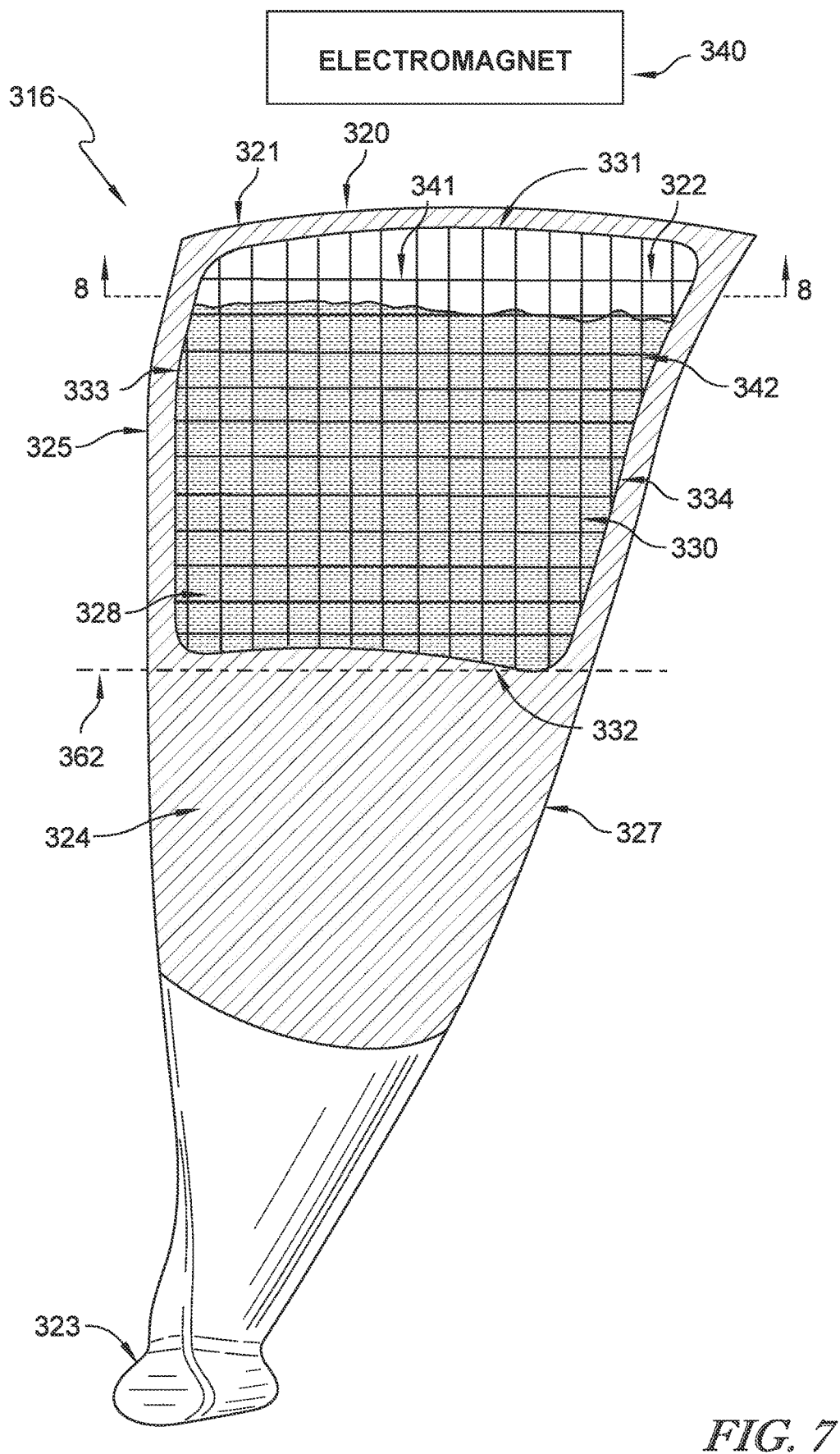
FIG. 7 is a cross-sectional view of another embodiment according to the present disclosure of one of the airfoils of FIG. 1 similar to the airfoils of FIGS. 2-6, and showing that the at least one obstructing member includes a mesh grid, the grid being formed by a plurality of rods or wires extending in two directions, one direction from the leading edge to the trailing edge and another direction from the radially outer top surface to the radially inner bottom surface, which therefore separates the pressure side from the suction side.
Figure 8:
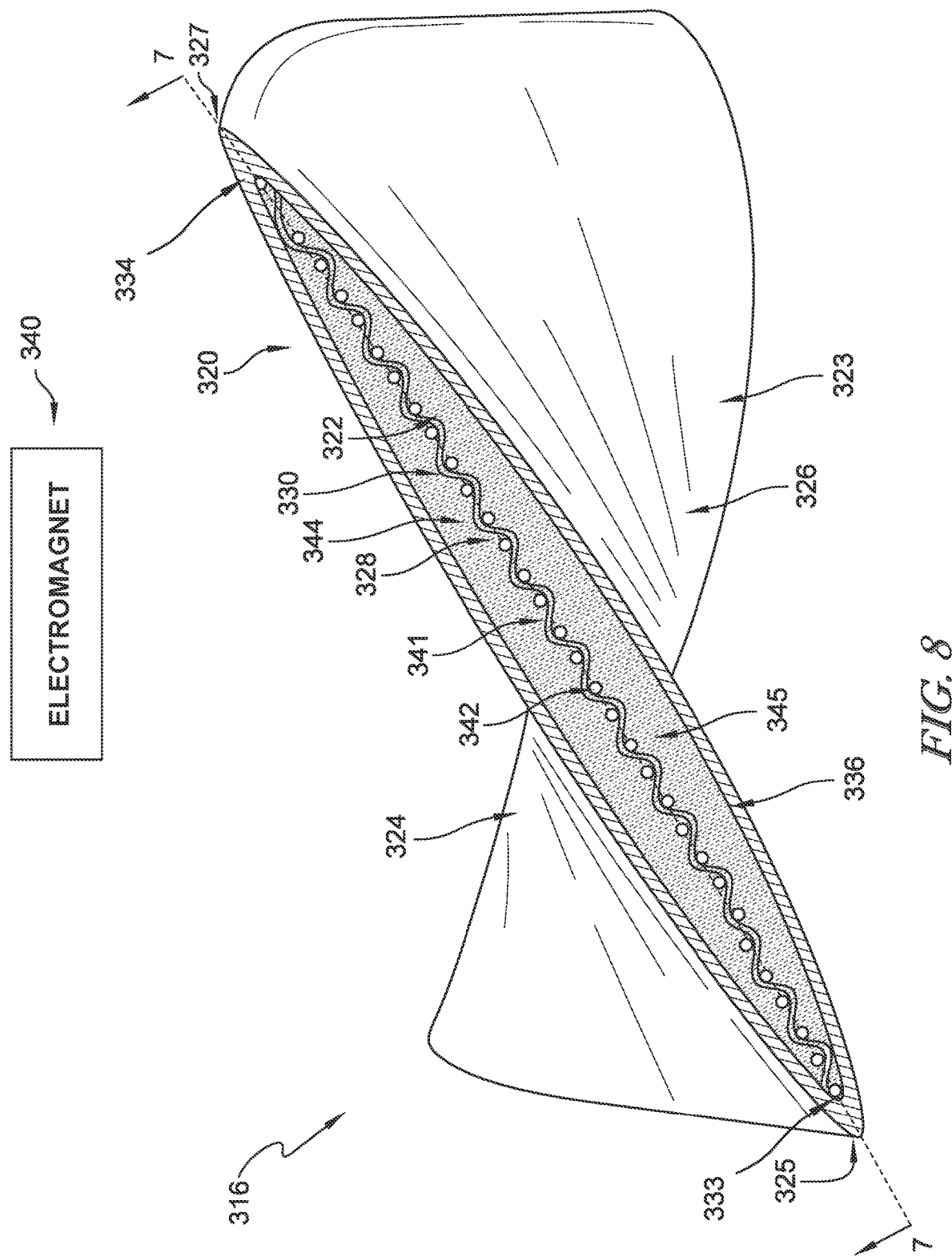
FIG. 8 is a top cross-sectional view of the airfoil of FIG. 7 showing that a first group of rods or wires extend from the leading edge surface to the trailing edge surface of the cavity, and that a second group of rods or wires extend in the direction from the radially inner bottom surface to the radially outer top surface and terminate before touching both the pressure side surface to the suction side surface.

Another embodiment of an airfoil 316 in accordance with the present disclosure is shown in FIGS. 7 and 8. The airfoil 316 is substantially similar to the airfoils 16, 116, 216 described herein. Accordingly, similar reference numbers in the 300 series indicate features that are common between the airfoil 316 and the airfoils 16, 116, 216. The descriptions of the airfoils 16, 116, 216 are incorporated by reference to apply to the airfoil 316, except in instances when it conflicts with the specific description and the drawings of the airfoil 316. It should be understood that the airfoil 316 may be utilized in the gas turbine engine 110 similarly to how the airfoils 16, 116, 216 are utilized, in particular in a bladed rotor assembly 10 and/or a vane assembly 70. Moreover, the airfoil 316 may be utilized along with the airfoils 16, 116, 216 within a single assembly 10, 70, or only airfoils 316 may be utilized. Any combination of the airfoils 16, 116, 216, 316 and the airfoils described in further detail below may be utilized in the assemblies 10, 70 as well.

The airfoil 316 is formed similarly to the airfoils 16, 116, 216 described above. In particular, the airfoil 316 includes an airfoil body 320 as shown in FIG. 7. The airfoil body 320 includes an airfoil tip 321 spaced apart radially outward from an airfoil root 323, the airfoil root 323 located adjacent to the wheel 12 in embodiments in which the airfoil 316 is utilized in a bladed rotor assembly 10, as shown in FIG. 17. In embodiments in which the airfoil 316 is utilized in a vane assembly 70, the tip 321 may be located adjacent an outer platform 1172 and the root 323 may be located adjacent an inner platform 1174, as shown in FIG. 16. The airfoil body 320 has a leading edge 325, a trailing edge 327 opposite the leading edge 325, a pressure side external surface 324, and a suction side external surface 326 opposite the pressure side 324.

The airfoil 316 is formed to include a cavity 322 within the airfoil body 320 as shown in FIGS. 7 and 8. The cavity 322 is formed as hollowed-out space similar to the cavity 22, 122, 222 being defined by a radially outer top surface 331, a radially inner bottom surface 332, a first inner side surface 333, a second inner side surface 334, a pressure side inner surface 335, and a suction side inner surface 336. The cavity 322 may be formed to be volumetrically larger or smaller than the embodiment illustrated in FIGS. 7 and 8 depending on the expected forces acting on the airfoil 316.

The airfoil body 320 further includes a magnetorheological fluid 330 disposed within the cavity 322 as shown in FIGS. 7 and 8. Similar to the fluid 30, 130, 230 of the airfoils 16, 116, 216, the fluid 330 may be a magnetorheological fluid which increases in viscosity when in the presence of a magnetic field such that, when the magnetic field is introduced after vibrations in the airfoil are detected or when known responses are to be damped, vibrations of the airfoil 316 are damped via the movement of the thicker fluid 330 relative to the side walls of the cavity 322 and the obstructing member 328.

At least one electromagnet 340 is arranged within the gas turbine engine 110 in close proximity to the airfoil 316 as shown in FIG. 7. The electromagnet 340 is configured to generate the magnetic field that influences the magnetorheological fluid 330 to increase in viscosity, similar to the embodiments described above.

In the illustrative embodiment, the at least one obstructing member 328 includes a mesh grid 328 as shown in FIGS. 7 and 8. The mesh grid is formed by a first plurality of thin rods 341 extending from the first inner side surface 333 to the second inner side surface 334 and a second plurality of thin rods 342 extending from the radially inner bottom surface 332 to the radially outer top surface 331. In other embodiments, the mesh grid 328 may include thin wires as opposed to rods. In an alternative embodiment, the mesh grid 328 may include perforated sheet metal having holes positioned similarly to the mesh described above, or may include a sheet metal including holes therethrough and having ridges or other similar features that extend away from the sheet and abut at least one of the pressure and suction side surfaces. In further embodiments, the mesh grid 328 may include a 3D-printed sheet including the features described-above.

As can be seen in FIG. 8, the mesh grid suction side 344 is spaced apart from the suction side inner surface 336 of the cavity 322 and the mesh grid pressure side 345 is spaced apart from the pressure side inner surface 335 of the cavity 322. In this way, the mesh grid 328 is formed as a mesh panel that extends from the first inner side surface 333 to the second inner side surface 334. In other embodiments, the number of rods, the extent of each rod, and the width of the mesh grid relative to the pressure and suction side surfaces may be adjusted based on the requirements of the operating condition of the airfoil 316. Similar to the obstructing member 28, 128, 228 described above, the mesh grid 328 is configured to obstruct movement of the thickened fluid 330 in order to dampen vibrations of the airfoil 316.

In the illustrative embodiment, the airfoil 316, which includes the mesh grid 316, affects a through-thickness motion of the fluid 330. Because of the hinderance of the through-thickness motion of the fluid 330, the mesh grid 330 may provide optimal damping of the airfoil 316 in response to bending of the airfoil 16. That is, when the airfoil 16 bends along an axis 362 that extends from the leading edge 325 to the trailing edge 327 of the airfoil 316, the movement of the thickened fluid 330 within the cavity 322 improves the damping of the airfoil 316. Moreover, arrangement of the cavity 322 within the airfoil 316 may be altered such that the cavity 322 is located near a peak displacement for a particular mode or near a peak strain.

Figure 9:
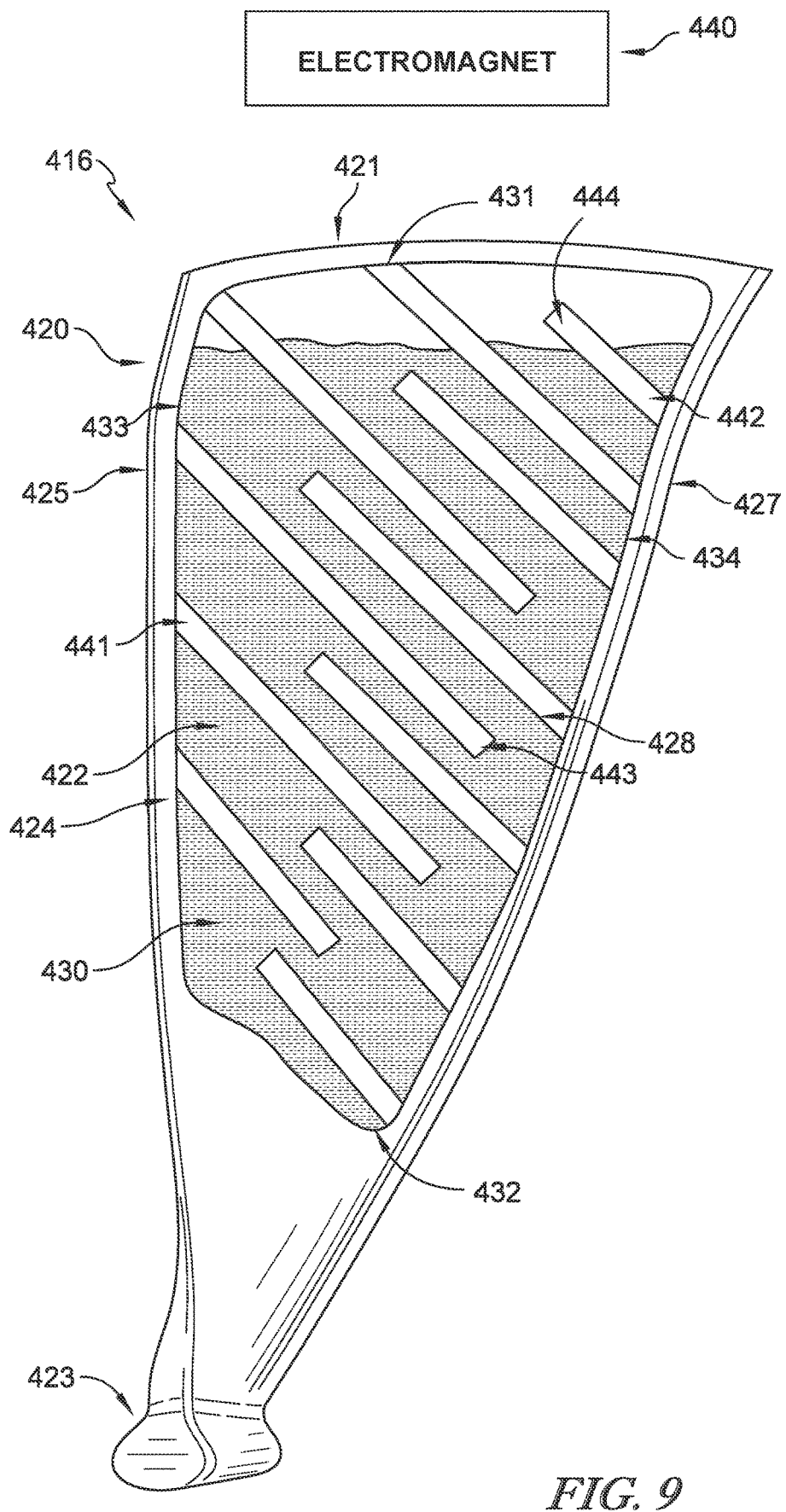
FIG. 9 is a cross-sectional view of another embodiment according to the present disclosure of one of the airfoils of FIG. 1 similar to the airfoils of FIGS. 2-8, showing that the at least one obstructing member includes a plurality of radially extending walls, where some of the walls extend at an angle from the first inner side surface of the cavity near the leading edge of the airfoil and some of the walls extend at an angle from the second inner side surface of the cavity near the trailing edge of the airfoil, and showing that the walls that extend from the first inner side surface alternate with the walls that extend from the second inner side surface.

Another embodiment of an airfoil 416 in accordance with the present disclosure is shown in FIG. 9. The airfoil 416 is substantially similar to the airfoils 16, 116, 216, 316 described herein. Accordingly, similar reference numbers in the 400 series indicate features that are common between the airfoil 416 and the airfoils 16, 116, 216, 316. The descriptions of the airfoils 16, 116, 216, 316 are incorporated by reference to apply to the airfoil 416, except in instances when it conflicts with the specific description and the drawings of the airfoil 416. It should be understood that the airfoil 416 may be utilized in the gas turbine engine 110 similarly to how the airfoils 16, 116, 216, 316 are utilized, in particular in a bladed rotor assembly 10 and/or a vane assembly 70. Moreover, the airfoil 416 may be utilized along with the airfoils 16, 116, 216, 316 within a single assembly 10, 70, or only airfoils 416 may be utilized. Any combination of the airfoils 16, 116, 216, 316, 416 and the airfoils described in further detail below may be utilized in the assemblies 10, 70 as well.

The airfoil 416 is formed similarly to the airfoils 16, 116, 216, 316 described above. In particular, the airfoil 416 includes an airfoil body 420 as shown in FIG. 9. The airfoil body 420 includes an airfoil tip 421 spaced apart radially outward from an airfoil root 423, the airfoil root 423 located adjacent to the wheel 12 in embodiments in which the airfoil 416 is utilized in a bladed rotor assembly 10, as shown in FIG. 17. In embodiments in which the airfoil 416 is utilized in a vane assembly 70, the tip 421 may be located adjacent an outer platform 1172 and the root 423 may be located adjacent an inner platform 1174, as shown in FIG. 16. The airfoil body 420 has a leading edge 425, a trailing edge 427 opposite the leading edge 425, a pressure side external surface 424, and a suction side external surface 426 opposite the pressure side 424.

The airfoil 416 is formed to include a cavity 422 within the airfoil body 420 as shown in FIG. 9. The cavity 422 is formed as hollowed-out space similar to the cavity 22, 122, being defined by a radially outer top surface 431, a radially inner bottom surface 432, a first inner side surface 433, a second inner side surface 434, a pressure side inner surface 435, and a suction side inner surface 436. The cavity 422 may be formed to be volumetrically larger or smaller than the embodiment illustrated in FIG. 9 depending on the expected forces acting on the airfoil 416.

The airfoil body 420 further includes a magnetorheological fluid 430 disposed within the cavity 422 as shown in FIG. 9. Similar to the fluid 30, 130, 230, 330 of the airfoils 16, 116, 216, 316, the fluid 430 may be a magnetorheological fluid which increases in viscosity when in the presence of a magnetic field such that, when the magnetic field is introduced after vibrations in the airfoil are detected or when known responses are to be damped, vibrations of the airfoil 416 are damped via the movement of the thicker fluid 430 relative to the side walls of the cavity 422 and the obstructing member 428.

At least one electromagnet 440 is arranged within the gas turbine engine 110 in close proximity to the airfoil 416 as shown in FIG. 9. The electromagnet 440 is configured to generate the magnetic field that influences the magnetorheological fluid 430 to increase in viscosity, similar to the embodiments described above.

In the illustrative embodiment, the at least one obstructing member 428 includes a plurality of angled walls 428 as shown in FIG. 9. The angled walls 428 are formed similarly to the angled walls 228 described above, in particular the arrangement of the first angled walls 441 and the second angled walls 442, and the walls 441, 442 alternating and extending beyond the terminal ends 443, 444 of the adjacent walls 441, 442. The plurality of angled walls 428 differ from the angled walls 228 in that the radially inner bottom surface 432 of the cavity 422 is located radially inwardly of a halfway point of a radial extent of the airfoil body 420 as shown in FIG. 9. As such, the cavity 422 occupies a majority of the interior of the airfoil body 420. In the embodiment shown in FIG. 9, the plurality of angled walls 428 includes five first angled walls 441 and six second angled walls 442.

In other embodiments, the number of walls and the extent of each wall may be adjusted based on the operating condition of the airfoil 416. Similar to the obstructing member 28, 128, 228, 328 described above, the plurality of walls 428 are configured to obstruct movement of the thickened fluid 430 in order to dampen vibrations of the airfoil 416.

Figure 10:
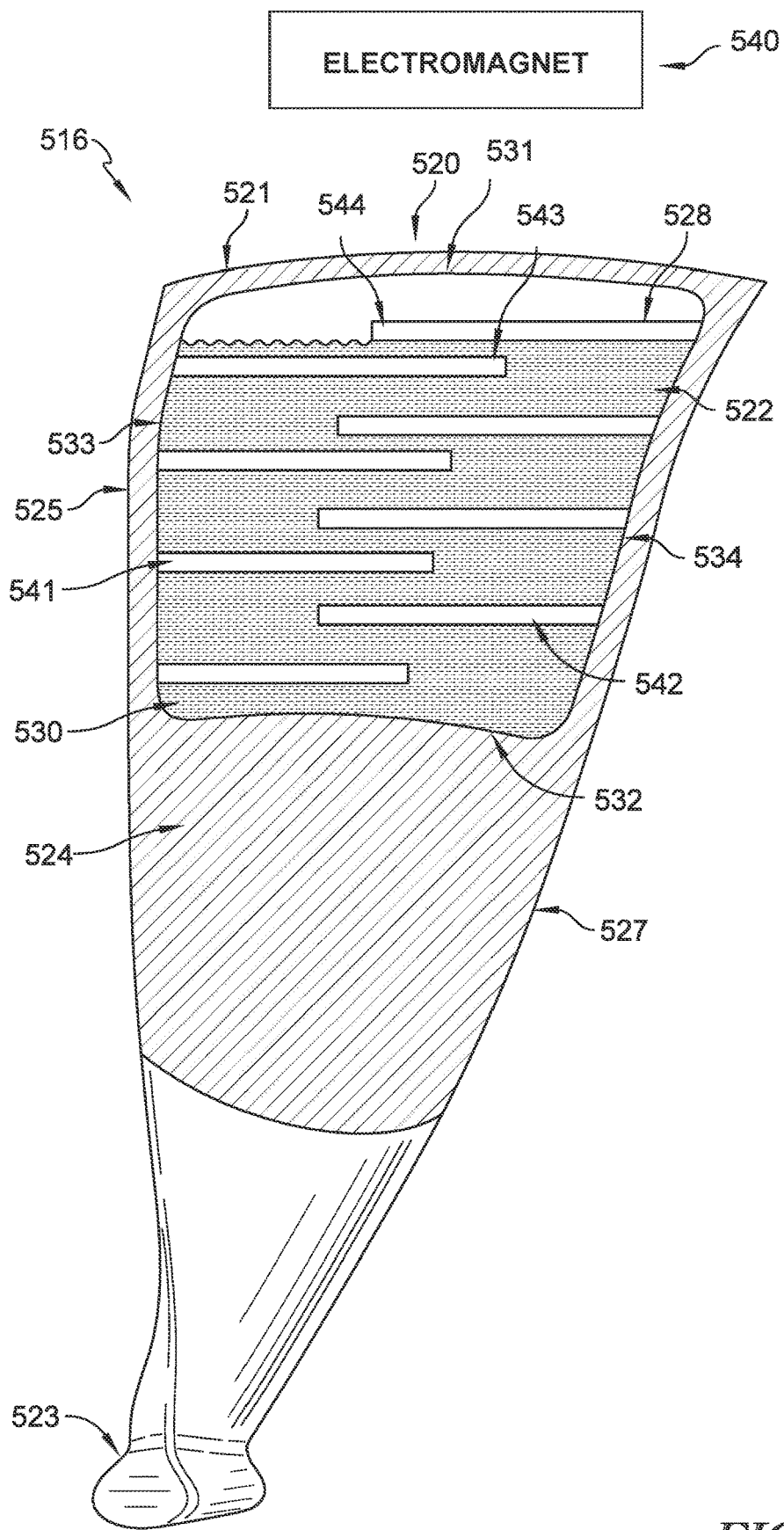
FIG. 10 is a cross-sectional view of another embodiment according to the present disclosure of the airfoils of FIG. 1 similar to the airfoils of FIGS. 2-9, showing that the at least one obstructing member includes a plurality of walls that extend in the direction from the first inner side surface to the second inner side surface of the cavity and vice versa, where some of the walls extend generally perpendicularly away from the first inner side surface of the cavity and some of the walls extend generally perpendicularly away from the second inner side surface of the cavity, and showing that the walls that extend from the first inner side surface alternate with the walls that extend from the second inner side surface.

Another embodiment of an airfoil 516 in accordance with the present disclosure is shown in FIG. 10. The airfoil 516 is substantially similar to the airfoils 16, 116, 216, 316, 416 described herein. Accordingly, similar reference numbers in the 500 series indicate features that are common between the airfoil 516 and the airfoils 16, 116, 216, 316, 416. The descriptions of the airfoils 16, 116, 216, 316, 416 are incorporated by reference to apply to the airfoil 516, except in instances when it conflicts with the specific description and the drawings of the airfoil 516. It should be understood that the airfoil 516 may be utilized in the gas turbine engine 110 similarly to how the airfoils 16, 116, 216, 316, 416 are utilized, in particular in a bladed rotor assembly 10 and/or a vane assembly 70. Moreover, the airfoil 516 may be utilized along with the airfoils 16, 116, 216, 316, 416 within a single assembly 10, 70, or only airfoils 516 may be utilized. Any combination of the airfoils 16, 116, 216, 316, 416, 516 and the airfoils described in further detail below may be utilized in the assemblies 10, 70 as well.

The airfoil 516 is formed similarly to the airfoils 16, 116, 216, 316, 416 described above. In particular, the airfoil 516 includes an airfoil body 520 as shown in FIG. 10. The airfoil body 520 includes an airfoil tip 521 spaced apart radially outward from an airfoil root 523, the airfoil root 523 located adjacent to the wheel 12 in embodiments in which the airfoil 516 is utilized in a bladed rotor assembly 10, as shown in FIG. 17. In embodiments in which the airfoil 516 is utilized in a vane assembly 70, the tip 521 may be located adjacent an outer platform 1172 and the root 523 may be located adjacent an inner platform 1174, as shown in FIG. 16. The airfoil body 520 has a leading edge 525, a trailing edge 527 opposite the leading edge 525, a pressure side external surface 524, and a suction side external surface 526 opposite the pressure side 524.

The airfoil 516 is formed to include a cavity 522 within the airfoil body 520 as shown in FIG. 10. The cavity 522 is formed as hollowed-out space similar to the cavity 22, 122, 222, 322, 422 being defined by a radially outer top surface 531, a radially inner bottom surface 532, a first inner side surface 533, a second inner side surface 534, a pressure side inner surface 535, and a suction side inner surface 536. The cavity 522 may be formed to be volumetrically larger or smaller than the embodiment illustrated in FIG. 10 depending on the expected forces acting on the airfoil 516.

The airfoil body 520 further includes a magnetorheological fluid 530 disposed within the cavity 522 as shown in FIG. 10. Similar to the fluid 30, 130, 230, 330, 430 of the airfoils 16, 116, 216, 316, 416, the fluid 530 may be a magnetorheological fluid which increases in viscosity when in the presence of a magnetic field such that, when the magnetic field is introduced after vibrations in the airfoil are detected or when known responses are to be damped, vibrations of the airfoil 516 are damped via the movement of the thicker fluid 530 relative to the side walls of the cavity 522 and the obstructing member 528.

At least one electromagnet 540 is arranged within the gas turbine engine 110 in close proximity to the airfoil 516 as shown in FIG. 10. The electromagnet 540 is configured to generate the magnetic field that influences the magnetorheological fluid 530 to increase in viscosity, similar to the embodiments described above.

In the illustrative embodiment, the at least one obstructing member 528 includes a plurality of walls 528 as shown in FIG. 10. The plurality of walls 528 are formed similarly to the walls 128 described above, in particular the first and second walls 541, 542 alternating and extending beyond the terminal ends 543, 544 of the adjacent walls 541, 542. The plurality of walls 528 differ from the walls 128 in that the first walls 541 extend generally perpendicularly away from the first inner side surface 533 of the cavity 522 and the second walls 542 extend generally perpendicularly away from the second inner side surface 534 of the first cavity 522. In the illustrative embodiment, the walls 528 include four first walls 541 and four second walls 542.

In other embodiments, the number of walls and the extent of each wall may be adjusted based on the operating condition of the airfoil 516. Similar to the obstructing members 28, 128, 228, 328, 428 described above, the plurality of walls 528 are configured to obstruct movement of the thickened fluid 530 in order to dampen vibrations of the airfoil 516.

Figure 11:
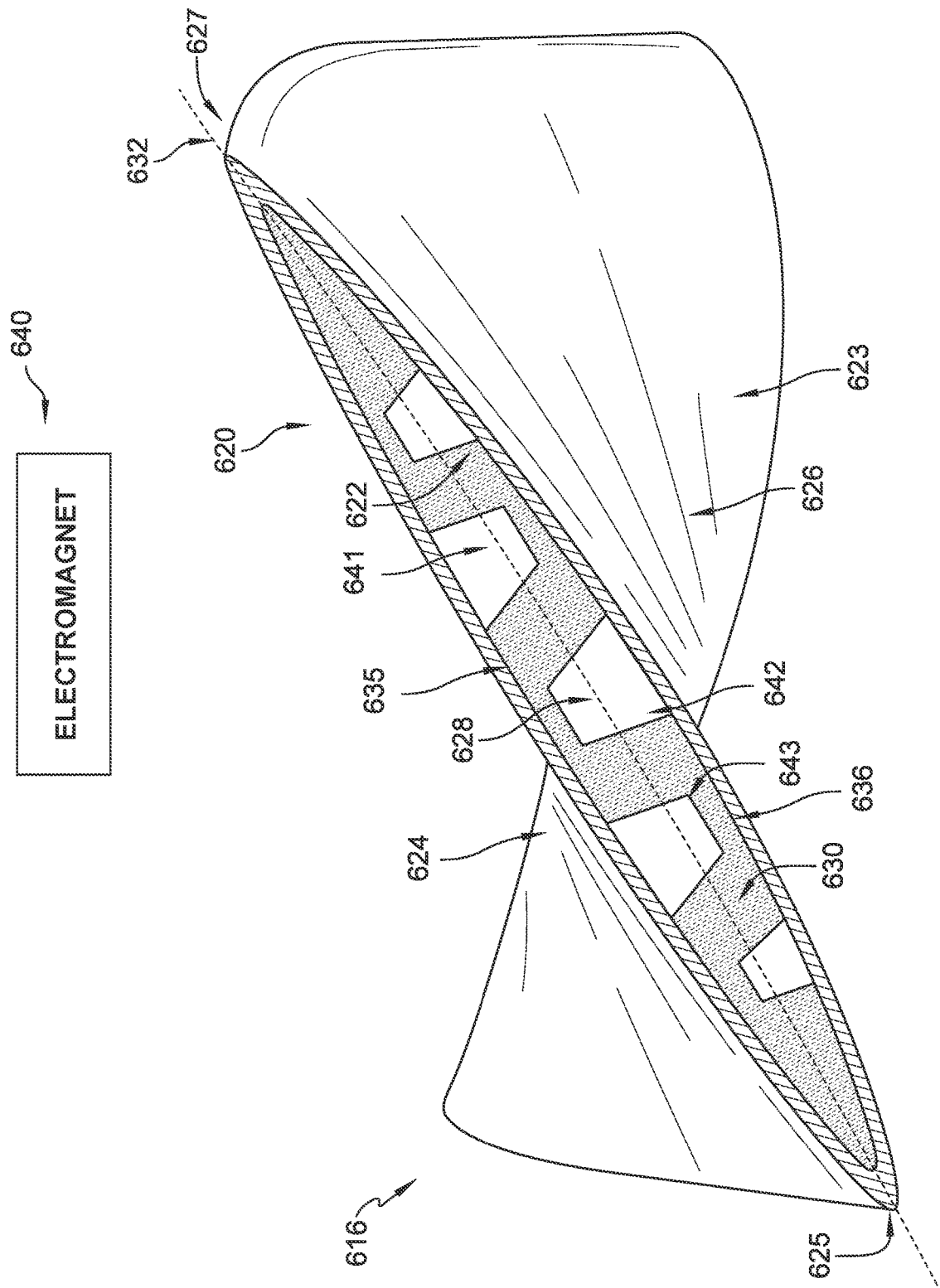
FIG. 11 is a top cross-sectional view of another embodiment according to the present disclosure of the airfoils of FIG. 1 similar to the airfoils of FIGS. 2-10, showing that the at least one obstructing member includes a plurality of ridges that extend radially, where some of the ridges extend from the pressure side surface and some of the ridges extend from the suction side surface, showing that the ridges that extend from the pressure side surface alternate with the walls that extend from the suction side surface, and showing that ridges do not contact the opposing surface to allow for movement of the fluid between the ridges.

Another embodiment of an airfoil 616 in accordance with the present disclosure is shown in FIG. 11. The airfoil 616 is substantially similar to the airfoils 16, 116, 216, 316, 416, 516 described herein. Accordingly, similar reference numbers in the 600 series indicate features that are common between the airfoil 616 and the airfoils 16, 116, 216, 316, 416, 516. The descriptions of the airfoils 16, 116, 216, 316, 416, 516 are incorporated by reference to apply to the airfoil 616, except in instances when it conflicts with the specific description and the drawings of the airfoil 616. It should be understood that the airfoil 616 may be utilized in the gas turbine engine 110 similarly to how the airfoils 16, 116, 216, 316, 416, 516 are utilized, in particular in a bladed rotor assembly 10 and/or a vane assembly 70. Moreover, the airfoil 616 may be utilized along with the airfoils 16, 116, 216, 316, 416, 516 within a single assembly 10, 70, or only airfoils 616 may be utilized. Any combination of the airfoils 16, 116, 216, 316, 416, 516, 616 and the airfoils described in further detail below may be utilized in the assemblies 10, 70 as well.

The airfoil 616 is formed similarly to the airfoils 16, 116, 216, 316, 416, 516 described above. In particular, the airfoil 616 includes an airfoil body 620 as shown in FIG. 11. Like the airfoils 16, 116, 216, 316, 416, 516, the airfoil body 620 includes an airfoil tip (not illustrated due to cross-section) spaced apart radially outward from an airfoil root 623, a leading edge 625, a trailing edge 627 opposite the leading edge 625, a pressure side external surface 624, and a suction side external surface 626 opposite the pressure side 624.

The airfoil 616 is formed to include a cavity 622 within the airfoil body 620 as shown in FIG. 11. The cavity 622 is formed as hollowed-out space similar to the cavity 22, 122, 222, 322, 422, 522 being defined by a radially outer top surface (not illustrated due to cross-section), a radially inner bottom surface (not illustrated due to cross-section), a first inner side surface 633, a second inner side surface 634, a pressure side inner surface 635, and a suction side inner surface 636. The cavity 622 may be formed to be volumetrically larger or smaller than the embodiment illustrated in FIG. 11 depending on the expected forces acting on the airfoil 616.

The airfoil body 620 further includes a magnetorheological fluid 630 disposed within the cavity 622 as shown in FIG. 11. Similar to the fluid 30, 130, 230, 330, 430, 530 of the airfoils 16, 116, 216, 316, 416, 516, the fluid 630 may be a magnetorheological fluid which increases in viscosity when in the presence of a magnetic field such that, when the magnetic field is introduced after vibrations in the airfoil are detected or when known responses are to be damped, vibrations of the airfoil 616 are damped via the movement of the thicker fluid 630 relative to the side walls of the cavity 622 and the obstructing member 628.

At least one electromagnet 640 is arranged within the gas turbine engine 110 in close proximity to the airfoil 616 as shown in FIG. 11. The electromagnet 640 is configured to generate the magnetic field that influences the magnetorheological fluid 630 to increase in viscosity, similar to the embodiments described above.

In the illustrative embodiment, the at least one obstructing member 628 includes a plurality of ridges 628 as shown in FIG. 11. The plurality of ridges include at least one first ridge 641 extending away from the pressure side inner surface 635 of the cavity 622 and at least one second ridge 642 extending away from the suction side inner surface 636 of the cavity 622. Each first ridge 641 and each second ridge 642 includes a terminal end 643, 644. The plurality of ridges 628 alternate between the at least one first ridge 641 and the at least one second ridge 642 in a direction from the leading edge 625 to the trailing edge 627 of the airfoil body 620. Each first ridge 641 extends beyond the terminal end 644 of an adjacent second ridge 642 in a direction from the pressure side inner surface 635 to the suction side inner surface 636, and each second ridge 642 extends beyond the terminal end 643 of an adjacent second ridge 641.

In the illustrative embodiment, the longitudinal extent of the ridges 628 extend in a direction from the root 623 to the tip of the airfoil body 620. the ridges 628 are formed to have cross-sectional trapezoidal shapes. In other embodiments, the other shapes may be utilized as the shapes of the ridges 628, such as triangles, squares, semi-circles, and other similar shapes, so long as the ridges 628 alter the movement of the thickened fluid 630. The plurality of ridges 628 may include five total ridges 628 as shown in FIG. 11. In other embodiments, the number of ridges, the extent of the ridges, and the altering of the ridges may be adjusted based on the operating condition of the airfoil 616. Similar to the obstructing members 28, 128, 228, 328, 428, 528 described above, the ridges 628 is configured to obstruct movement of the thickened fluid 630 in order to dampen vibrations of the airfoil 616.

Figure 12:
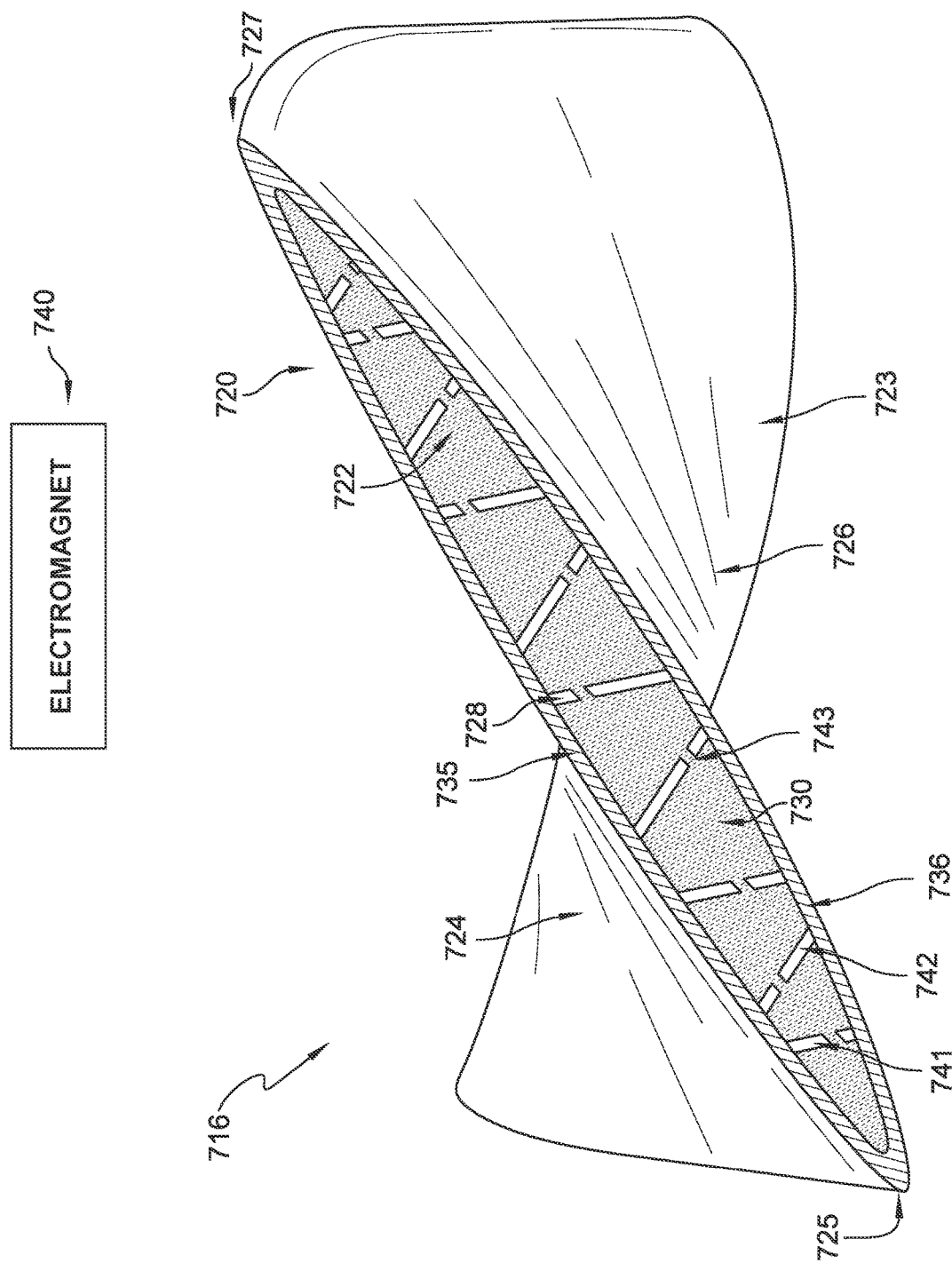
FIG. 12 is a top cross-sectional view of another embodiment according to the present disclosure of the airfoils of FIG. 1 similar to the airfoils of FIGS. 2-11, showing that the at least one obstructing member includes a plurality of walls with orifices formed therein, and showing that the walls extend at an angle from the pressure side surface and from the suction side surface, and showing that the location of the orifices in adjacent walls are staggered along a longitudinal extent of the walls.

Another embodiment of an airfoil 716 in accordance with the present disclosure is shown in FIG. 12. The airfoil 716 is substantially similar to the airfoils 16, 116, 216, 316, 416, 516, 616 described herein. Accordingly, similar reference numbers in the 700 series indicate features that are common between the airfoil 716 and the airfoils 16, 116, 216, 316, 416, 516, 616. The descriptions of the airfoils 16, 116, 216, 316, 416, 516, 616 are incorporated by reference to apply to the airfoil 716, except in instances when it conflicts with the specific description and the drawings of the airfoil 716. It should be understood that the airfoil 716 may be utilized in the gas turbine engine 110 similarly to how the airfoils 16, 116, 216, 316, 416, 516, 616 are utilized, in particular in a bladed rotor assembly 10 and/or a vane assembly 70. Moreover, the airfoil 716 may be utilized along with the airfoils 16, 116, 216, 316, 416, 516, 616 within a single assembly 10, 70, or only airfoils 716 may be utilized. Any combination of the airfoils 16, 116, 216, 316, 416, 516, 616, 716 and the airfoils described in further detail below may be utilized in the assemblies 10, 70 as well.

The airfoil 716 is formed similarly to the airfoils 16, 116, 216, 316, 416, 516, 616 described above. In particular, the airfoil 716 includes an airfoil body 720 as shown in FIG. 12. Like the airfoils 16, 116, 216, 316, 416, 516, the airfoil body 720 includes an airfoil tip (not illustrated due to cross-section) spaced apart radially outward from an airfoil root 723, a leading edge 725, a trailing edge 727 opposite the leading edge 725, a pressure side external surface 724, and a suction side external surface 726 opposite the pressure side 724.

The airfoil 716 is formed to include a cavity 722 within the airfoil body 720 as shown in FIG. 12. The cavity 722 is formed as hollowed-out space similar to the cavity 22, 122, 222, 322, 422, 522, 622 being defined by a radially outer top surface (not illustrated due to cross-section), a radially inner bottom surface (not illustrated due to cross-section), a first inner side surface 733, a second inner side surface 734, a pressure side inner surface 735, and a suction side inner surface 736. The cavity 722 may be formed to be volumetrically larger or smaller than the embodiment illustrated in FIG. 12 depending on the expected forces acting on the airfoil 716.

The airfoil body 720 further includes a magnetorheological fluid 730 disposed within the cavity 722 as shown in FIG. 12. Similar to the fluid 30, 130, 230, 330, 430, 530, 630 of the airfoils 16, 116, 216, 316, 416, 516, 616, the fluid 730 may be a magnetorheological fluid which increases in viscosity when in the presence of a magnetic field such that, when the magnetic field is introduced after vibrations in the airfoil are detected or when known responses are to be damped, vibrations of the airfoil 716 are damped via the movement of the thicker fluid 730 relative to the side walls of the cavity 722 and the obstructing member 728.

At least one electromagnet 740 is arranged within the gas turbine engine 110 in close proximity to the airfoil 716 as shown in FIG. 12. The electromagnet 740 is configured to generate the magnetic field that influences the magnetorheological fluid 730 to increase in viscosity, similar to the embodiments described above.

In the illustrative embodiment, the at least one obstructing member 728 includes a plurality of walls 728 as shown in FIG. 12. The plurality of walls include at least one first wall 741 extending from the pressure side inner surface 735 to the suction side inner surface 736 at a first angle and at least one second wall 742 extending from the pressure side inner surface 735 to the suction side inner surface 736 at a second angle. The plurality of walls 728 alternate between the at least one first wall 741 and the at least one second wall 742 in a direction from the leading edge 724 to the trailing edge 727 of the airfoil body 720. Each wall 741, 742 includes an opening 743 formed therein to allow fluid 730 to pass therethrough and throughout the cavity 722. In the illustrative embodiment, the openings 743 are offset with the openings 743 in adjacent walls 741, 742 as shown in FIG. 12.

In other embodiments, the number of walls, the extent of the walls, the altering of the walls, and the placement of the openings may be adjusted based on the operating condition of the airfoil 716. Similar to the obstructing members 28, 128, 228, 328, 428, 528, 628 described above, the mesh grid 728 is configured to obstruct movement of the thickened fluid 730 in order to dampen vibrations of the airfoil 716.

Figure 13:
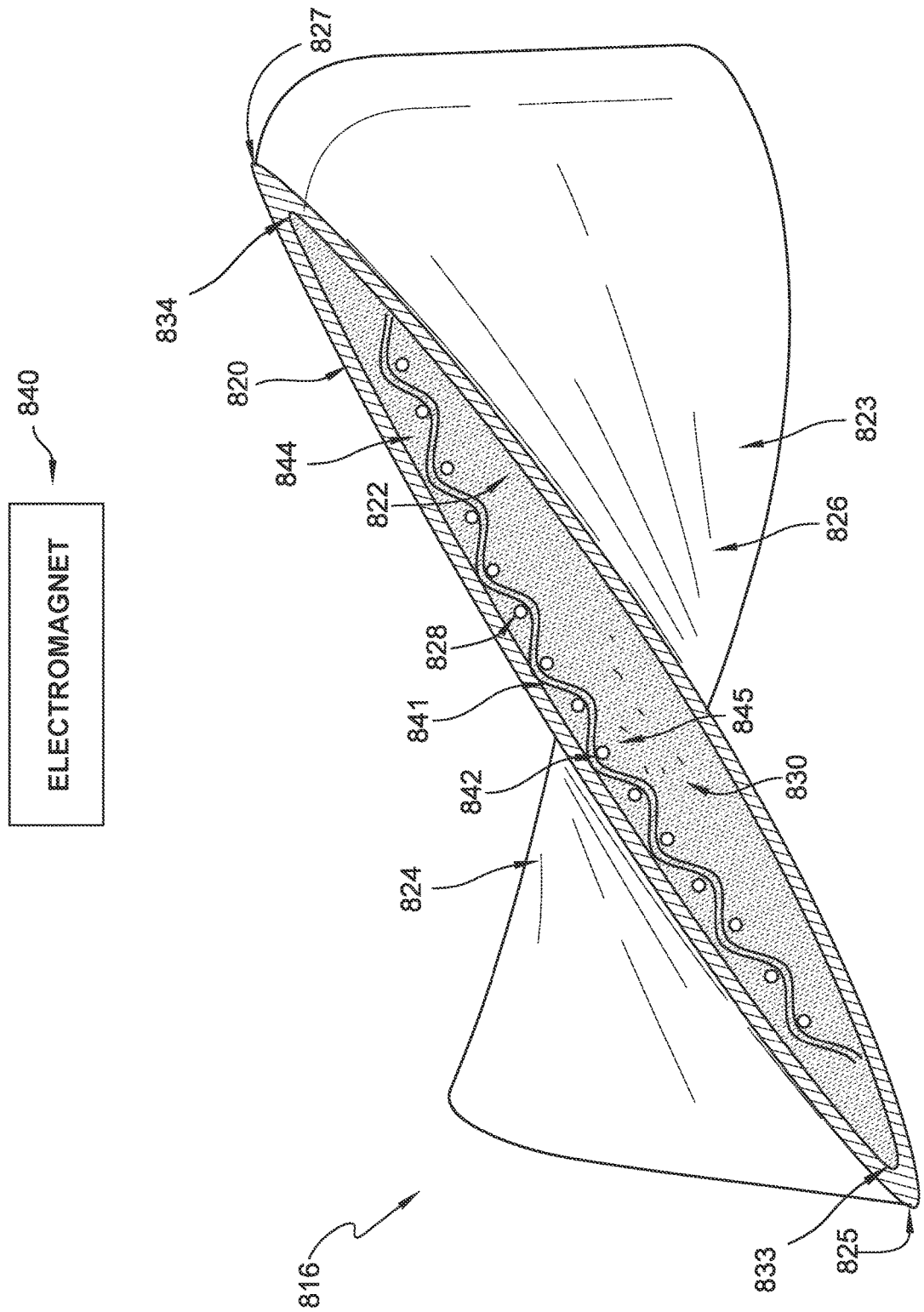
FIG. 13 is a top cross-sectional view of another embodiment according to the present disclosure of the airfoils of FIG. 1 similar to the airfoils of FIGS. 2-12, showing that the cavity extends from the pressure side surface to the suction side surface of the cavity and not entirely to the leading edge and the trailing edge of the airfoil, and showing that the at least one obstructing member includes a mesh grid, and showing that the mesh grid is curved in a direction from the leading edge surface to the trailing edge surface of the cavity.
Figure 14:
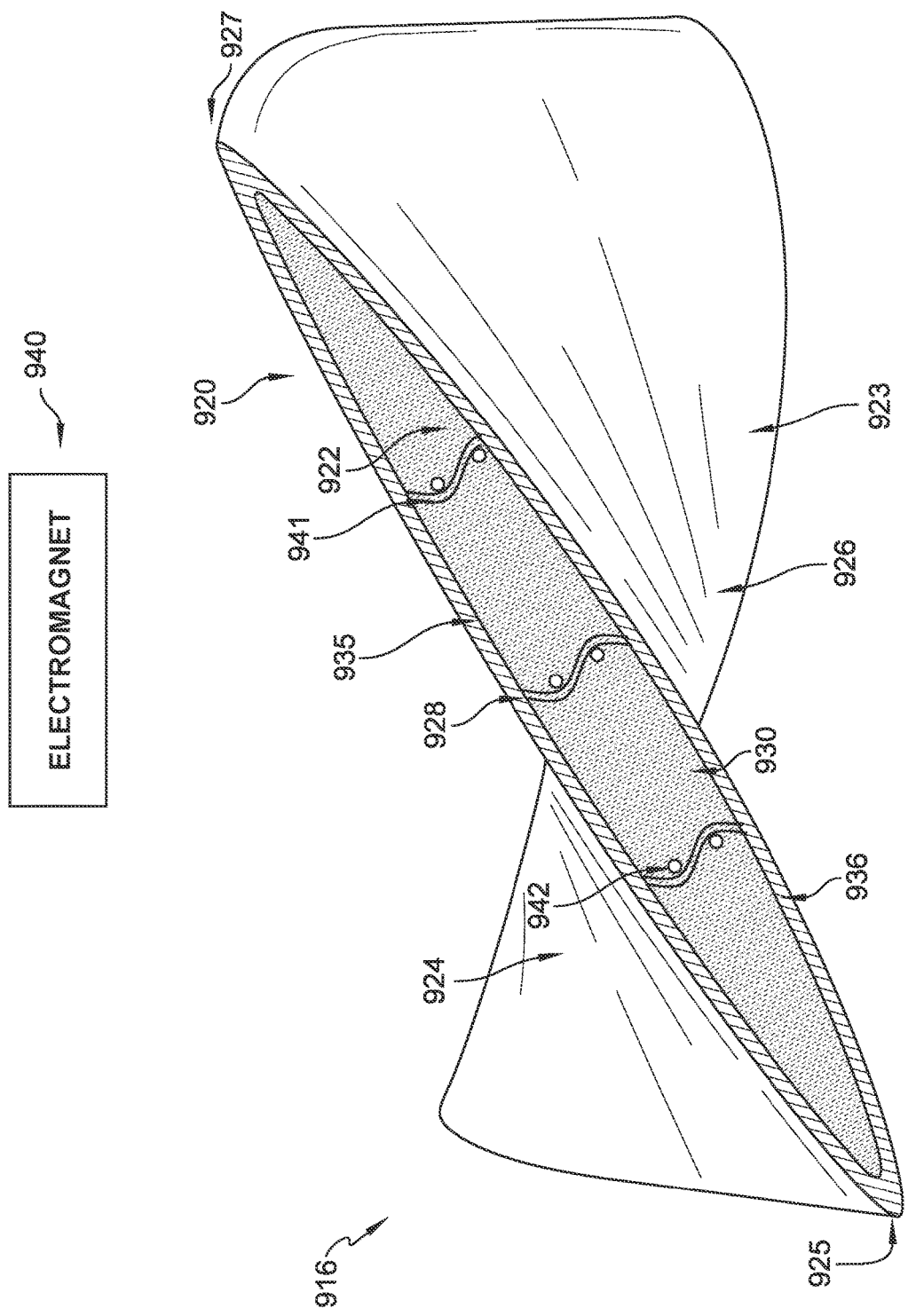
FIG. 14 is a top cross-sectional view of another embodiment according to the present disclosure of the airfoils of FIG. 1 similar to the airfoils of FIGS. 2-13, showing that the at least one obstructing member includes a plurality of mesh grids, and showing that the mesh grids are spaced apart in a direction from the leading edge surface to the trailing edge surface of the cavity and extend from the pressure side surface to the suction side surface.

Further embodiments of airfoils 816, 916 in accordance with the present disclosure is shown in FIGS. 13 and 14. The airfoils 816, 916 are substantially similar to the airfoils 16, 116, 216, 316, 416, 516, 616, 716 described herein. Accordingly, similar reference numbers in the 800 and 900 series indicate features that are common between the airfoils 816, 916 and the airfoils 16, 116, 216, 316, 416, 516, 616, 716. The descriptions of the airfoils 16, 116, 216, 316, 416, 516, 616, 716 are incorporated by reference to apply to the airfoils 816, 916 except in instances when it conflicts with the specific description and the drawings of the airfoils 816, 916. It should be understood that the airfoils 816, 916 may be utilized in the gas turbine engine 110 similarly to how the airfoils 16, 116, 216, 316, 416, 516, 616, 716 are utilized, in particular in a bladed rotor assembly 10 and/or a vane assembly 70. Moreover, the airfoils 816, 916 may be utilized along with the airfoils 16, 116, 216, 316, 416, 516, 616, 716 within a single assembly 10, 70, or only airfoils 816, 916 may be utilized. Any combination of the airfoils 16, 116, 216, 316, 416, 516, 616, 716 and the airfoils described in further detail below may be utilized in the assemblies 10, 70 as well.

The airfoils 816, 916 are formed similarly to the airfoils 16, 116, 216, 316, 416, 516, 616, 716 described above. In particular, the airfoil 716 includes an airfoil body 820, 920 as shown in FIGS. 13 and 14. Like the airfoils 16, 116, 216, 316, 416, 516, 616, 716, the airfoil body 820, 920 includes an airfoil tip (not illustrated due to cross-section) spaced apart radially outward from an airfoil root 823, 923, a leading edge 825, 925, a trailing edge 827, 927 opposite the leading edge 825, 925, a pressure side external surface 824, 924, and a suction side external surface 826, 926 opposite the pressure side 824, 924.

The airfoils 816, 916 are formed to include a cavity 822, 922 within the airfoil body 820, 920 as shown in FIGS. 13 and 14. The cavity 822, 922 is formed as hollowed-out space similar to the cavity 22, 122, 222, 322, 422, 522, 622, 722 being defined by a radially outer top surface (not illustrated due to cross-section), a radially inner bottom surface (not illustrated due to cross-section), a first inner side surface 833, 933, a second inner side surface 834, 934, a pressure side inner surface 835, 935, and a suction side inner surface 836, 936. The cavity 822, 922 may be formed to be volumetrically larger or smaller than the embodiment illustrated in FIGS. 13 and 14 depending on the expected forces acting on the airfoil 816, 916.

The airfoil body 820, 920 further includes a magnetorheological fluid 830, 930 disposed within the cavity 822, 922 as shown in FIGS. 13 and 14. Similar to the fluid 30, 130, 230, 330, 430, 530, 630, 730 of the airfoils 16, 116, 216, 316, 416, 516, 616, 716, the fluid 830, 930 may be a magnetorheological fluid which increases in viscosity when in the presence of a magnetic field such that, when the magnetic field is introduced after vibrations in the airfoil are detected or when known responses are to be damped, vibrations of the airfoil 816, 916 are damped via the movement of the thicker fluid 830, 930 relative to the side walls of the cavity 822, 922 and the obstructing member 828, 928.

At least one electromagnet 840, 940 is arranged within the gas turbine engine 110 in close proximity to the airfoil 816, 916 as shown in FIGS. 13 and 14. The electromagnet 840, 940 is configured to generate the magnetic field that influences the magnetorheological fluid 830, 930 to increase in viscosity, similar to the embodiments described above.

In the illustrative embodiment, the at least one obstructing member 828, 928 includes a mesh grid 828, 928 as shown in FIGS. 13 and 14. The mesh grids 828, 928 are formed similarly to the mesh grid 328 described above. In the embodiment shown in FIG. 13, the mesh grid 828 includes a first plurality of thin rods 841 extending from the first inner side surface 833 to the second inner side surface 834 and a second plurality of thin rods 842 extending from the radially inner bottom surface to the radially outer top surface (not illustrated due to cross-section). In the embodiment shown in FIG. 14, the mesh grid 928 includes a first plurality of thin rods 941 extending from the pressure side inner surface 935 to the suction side inner surface 936 and a second plurality of thin rods 942 extending from the radially inner bottom surface to the radially outer top surface (not illustrated due to cross-section). Although the views of FIGS. 13 and 14 show the fluid 830, 930 over the rods, it should be understood that the rods are solid and this is only shown for clarity purposes.

The mesh grid 828 of FIG. 13 differs from the mesh grid 328 in that the mesh grid 328 is curved in a direction from the leading edge 825 to the trailing edge 827. The mesh grid 928 of FIG. 14 differs from the mesh grid 328 in that the mesh grid 928 includes a plurality of mesh grid panels 950 that each extend from the pressure side inner surface 935 to the suction side inner surface 936. In other embodiments, the number of rods, the extent of each rod, and the width of the mesh grids relative to the pressure and suction side surfaces may be adjusted based on the operating condition of the airfoil 816, 916. Similar to the obstructing member 28, 128, 228, 328, 428, 528, 628, 728 described above, the mesh grids 828, 928 are configured to obstruct movement of the thickened fluid 830, 930 in order to dampen vibrations of the airfoil 816, 916.

Figure 15:
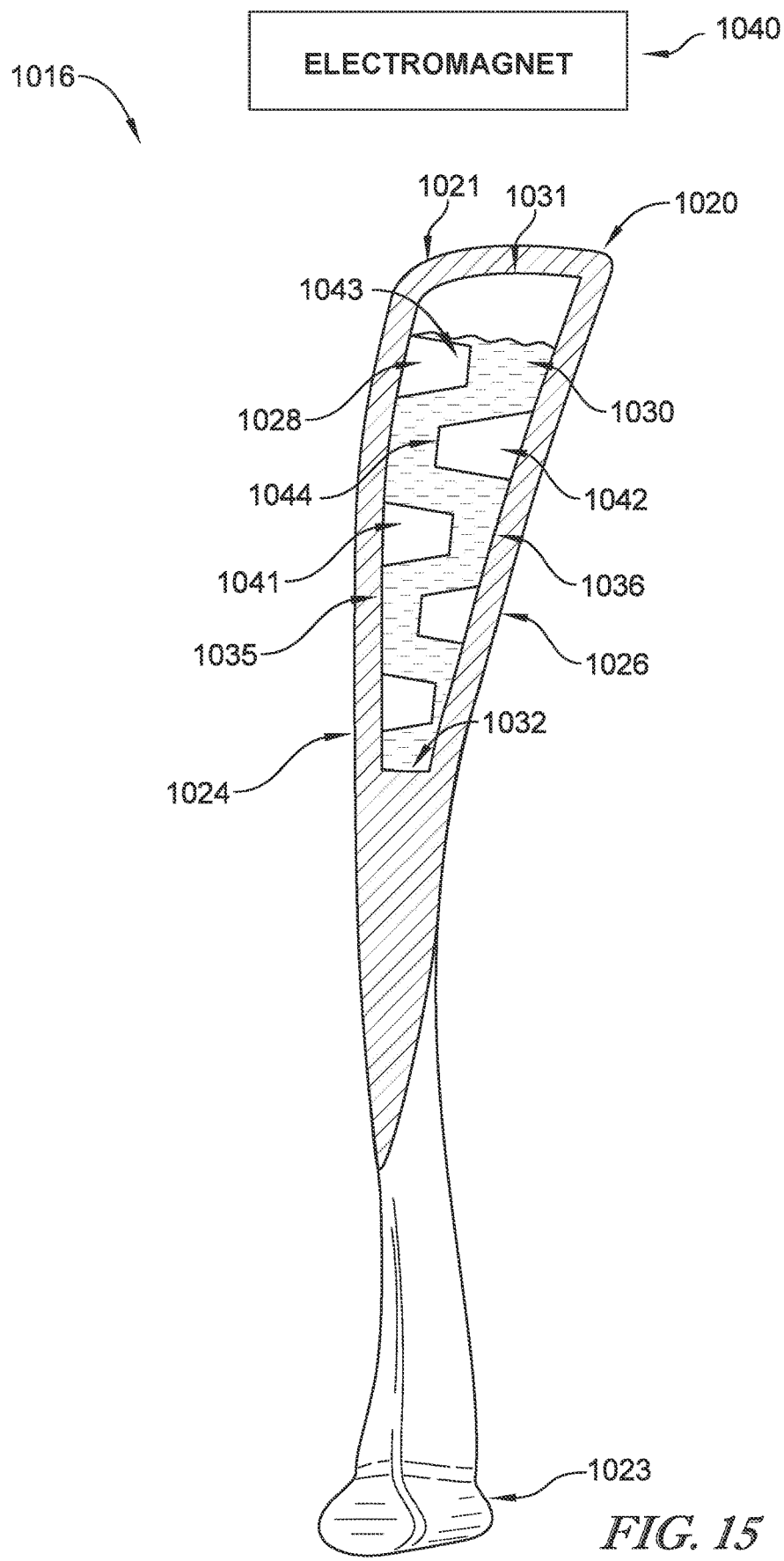
FIG. 15 is a side cross-section viewed in a direction from the leading edge to the trailing edge of another embodiment according to the present disclosure of the airfoils of FIG. 1 similar to the airfoils of FIGS. 2-14, and showing that the at least one obstructing member includes a plurality of ridges that extend in the direction from the leading edge to the trailing edge, where some of the ridges extend from the pressure side surface and some of the ridges extend from the suction side surface, showing that the ridges that extend from the pressure side surface alternate with the walls that extend from the suction side surface, and showing that ridges do not contact the opposing surface to allow for movement of the fluid between the ridges.

Another embodiment of an airfoil 1016 in accordance with the present disclosure is shown in FIG. 15. The airfoil 1016 is substantially similar to the airfoils 16, 116, 216, 316, 416, 516, 616, 716, 816, 916 described herein. Accordingly, similar reference numbers in the 1000 series indicate features that are common between the airfoil 1016 and the airfoils 16, 116, 216, 316, 416, 516, 616, 716, 816, 916. The descriptions of the airfoils 16, 116, 216, 316, 416, 516, 616, 716, 816, 916 are incorporated by reference to apply to the airfoil 1016, except in instances when it conflicts with the specific description and the drawings of the airfoil 1016. It should be understood that the airfoil 1016 may be utilized in the gas turbine engine 110 similarly to how the airfoils 16, 116, 216, 316, 416, 516, 616, 716, 816, 916 are utilized, in particular in a bladed rotor assembly 10 and/or a vane assembly 70. Moreover, the airfoil 1016 may be utilized along with the airfoils 16, 116, 216, 316, 416, 516, 616, 716, 816, 916 within a single assembly 10, 70, or only airfoils 1016 may be utilized. Any combination of the airfoils 16, 116, 216, 316, 416, 516, 616, 716, 816, 916, 1016 and the airfoils described in further detail below may be utilized in the assemblies 10, 70 as well.

The airfoil 1016 is formed similarly to the airfoils 16, 116, 216, 316, 416, 516, 616, 716, 816, 916 described above. In particular, the airfoil 1016 includes an airfoil body 1020 as shown in FIG. 15. Like the airfoils 16, 116, 216, 316, 416, 516, 616, 716, 816, 916, the airfoil body 1020 includes an airfoil tip 1021 spaced apart radially outward from an airfoil root 1023, a leading edge and a trailing edge opposite the leading edge (both not illustrated due to cross-section), a pressure side external surface 1024, and a suction side external surface 1026 opposite the pressure side 1024.

The airfoil 1016 is formed to include a cavity 1022 within the airfoil body 1020 as shown in FIG. 11. The cavity 1022 is formed as hollowed-out space similar to the cavity 22, 122, 222, 322, 422, 522, 622, 722, 822, 922 being defined by a radially outer top surface 1031, a radially inner bottom surface 1032, a first inner side surface and a second inner side surface (both not illustrated due to cross-section), a pressure side inner surface 1035, and a suction side inner surface 1036. The cavity 1022 may be formed to be volumetrically larger or smaller than the embodiment illustrated in FIG. 15 depending on the expected forces acting on the airfoil 1016.

The airfoil body 1020 further includes a magnetorheological fluid 1030 disposed within the cavity 1022 as shown in FIG. 15. Similar to the fluid 30, 130, 230, 330, 430, 530, 630, 730, 830, 930 of the airfoils 16, 116, 216, 316, 416, 516, 616, 716, 816, 916, the fluid 1030 may be a magnetorheological fluid which increases in viscosity when in the presence of a magnetic field such that, when the magnetic field is introduced after vibrations in the airfoil are detected or when known responses are to be damped, vibrations of the airfoil 1016 are damped via the movement of the thicker fluid 1030 relative to the side walls of the cavity 1022 and the obstructing member 1028.

At least one electromagnet 1040 is arranged within the gas turbine engine 110 in close proximity to the airfoil 116 as shown in FIG. 15. The electromagnet 1040 is configured to generate the magnetic field that influences the magnetorheological fluid 1030 to increase in viscosity, similar to the embodiments described above.

In the illustrative embodiment, the at least one obstructing member 1028 includes a plurality of ridges 1028 as shown in FIG. 15. The plurality of ridges 1028 are formed similarly to the ridges 628 described above, in particular to include at least one first ridge 1041 extending away from the pressure side inner surface 1035 and at least one second ridge 1042 extending away from the suction side inner surface 1036. Each first ridge 1041 and each second ridge 1042 includes a terminal end 1043, 1044. The plurality of ridges 1028 alternate between the at least one first ridge 1041 and the at least one second ridge 1042 in a direction from the radially inner bottom surface 1032 to the radially outer top surface 1031. Each first ridge 1041 extends beyond the terminal end 1044 of an adjacent second ridge 1042 in the direction from the radially inner bottom surface 1032 to the radially outer top surface 1031, and each second ridge 1042 extends beyond the terminal end 1043 of an adjacent second ridge 1041.

The ridges 1028 differ from the ridges 628 described above in that the longitudinal extent of the ridges 1028 extend in a direction from the leading edge to the trailing edge of the airfoil body 1020 as shown in FIG. 15. In the illustrative embodiment, the ridges 1028 are formed to have cross-sectional trapezoidal shapes. In other embodiments, the other shapes may be utilized as the shapes of the ridges 1028, such as triangles, squares, semi-circles, and other similar shapes, so long as the ridges 1028 alter the movement of the thickened fluid 1030. The plurality of ridges 1028 may include five total ridges 1028 as shown in FIG. 15. In other embodiments, the number of ridges, the extent of the ridges, and the altering of the ridges may be adjusted based on the operating condition of the airfoil 1016. Similar to the obstructing members 28, 128, 228, 328, 428, 528, 628, 728, 828, 928 described above, the ridges 1028 is configured to obstruct movement of the thickened fluid 1030 in order to dampen vibrations of the airfoil 1016.

FIG. 16 illustrates an exemplary vane assembly 70, 1170 that may utilize any of the airfoils 16, 116, 216, 316, 416, 516, 616, 716, 816, 916, 1016 described above. The vane assembly 70, 1170 may include an outer platform 1172, and inner platform 1174, and a plurality of airfoils 1116 formed as vanes of the vane assembly 70, 1170. In the illustrative embodiment, the vane assembly is an outlet guide vane assembly arranged at the fan exit 116. The vane assembly 70, 1170 further includes an outer ring 1142 configured to support a plurality of electromagnets 1140 and arranged radially outward of the airfoils 1116. In some embodiments, the electromagnets 1140 may be disposed entirely around the circumference of the ring 1142, or only in select areas of the ring 1142. In response to the vane assembly 70, 1170 as a whole or individual airfoils 1116 experiencing an aeromechanic response and/or vibrations during use, the ring 1142 of the plurality of electromagnets 1140 will either generate a magnetic field or increase the intensity of an already generated magnetic field such that the magnetorheological fluid increase in viscosity and thus the airfoil vibrations will be damped.

The vane assembly 70, 1170 further includes at least one sensor 1180 configured to determine an operating condition of the airfoil 1116 and a controller 1190 operably connected to the at least one sensor 1180 and to the electromagnets 1140 as shown in FIG. 16. Specifically, the sensor 1180 is configured to detect whether the airfoil 1116 is experiencing an aeromechanical response or vibration, or may also be configured to detect whether the airfoil 1116 is experiencing a predetermined operating condition such as a predetermined speed of rotation of the airfoil 1116, a predetermined speed of forward travel of the airfoil 1116, a predetermined vibration of the airfoil 1116, and a predetermined distortion level of air flow interacting with the airfoil 1116.

In response to the sensor 1180 determining that the airfoil is operating in one of the first operating conditions discussed above, the controller 1190 instructs the electromagnets 1140 to generate a magnetic field or a second magnetic field greater than an initial, first magnetic field, such that the magnetorheological fluid 30 has an increased, second viscosity. In particular, the controller 1190 may be configured to automatically instruct the electromagnets 1140 to generate the second magnetic field in response to the sensor 1180 determining that the airfoil is operating in one of the first operating conditions. The controller 1190 may also be configured to input the sensed conditions and corresponding magnetic field intensity levels into a neural network or machine learning algorithm in which the controller 1190 may learn over time the level of intensity of the magnetic field to generate in response to particular operating conditions.

The controller 1190 may include at least one processor connected to a computer readable memory and/or other data storage. Computer executable instructions and data used by a processor may be stored in the computer readable memory included in an onboard computing device, a remote server, a combination of both, or implemented with any combination of read only memory modules or random access memory modules, optionally including both volatile and nonvolatile memory.

FIG. 17 illustrates an exemplary bladed rotor assembly 10, 1210 that may utilize any of the airfoils 16, 116, 216, 316, 416, 516, 616, 716, 816, 916, 1016 described above. The bladed rotor assembly 10, 1210 may include an inner wheel 1212 configured to rotate around the central axis 11 of the gas turbine engine 110. The plurality of airfoils 16, 116, 216, 316, 416, 516, 616, 716, 816, 916, 1016 are formed as blades 1216 of the bladed rotor assembly 10, 1210 that extend radially outwardly from the wheel 1212. The blades 1216 may attach to the wheel 1212 via the root 1223 of the blade, and each blade 1216 may also have a blade tip 1221. In the example illustrated in FIG. 17, the blade may include a cavity 1222, a plurality of pegs 1228 similar to the pegs 28 described above, and a magnetorheological fluid 1230.

The bladed rotor assembly 10, 1210 further includes an inner ring 1242 configured to support a plurality of electromagnets 1240 and arranged radially inward of the blades 1216. In some embodiments, the electromagnets 1240 are spaced apart circumferentially around the ring 1242. The bladed rotor assembly 10, 1210 may further include at least one sensor 1280 and a controller 1290 that function similarly to the sensor 1180 and controller 1190 described above.

FIG. 18 illustrates an exemplary vane assembly 70, 1370 that may utilize any of the airfoils 16, 116, 216, 316, 416, 516, 616, 716, 816, 916, 1016 described above. The vane assembly 70, 1370 is similar to the vane assembly 1170 described above, except that the ring 1342 supporting the plurality of electromagnets 1340 is arranged radially inwardly of the airfoils 1316. In some embodiments, the electromagnets 1340 may be disposed entirely around the circumference of the ring 1342, or only in select areas of the ring 1342. In response to the vane assembly 70, 1370 as a whole or individual airfoils 1316 experiencing an aeromechanic response and/or vibrations during use, the ring 1342 of the plurality of electromagnets 1340 will either generate a magnetic field or increase the intensity of an already generated magnetic field such that the magnetorheological fluid will increase in viscosity and thus the airfoil vibrations will be damped.

The vane assembly 70, 1370 further includes an inner ring 1342 configured to support a plurality of electromagnets 1340 and arranged radially inward of the vanes 1316. In some embodiments, the electromagnets 1340 are spaced apart circumferentially around the ring 1342 and in other embodiments, the electromagnets 1340 are arranged adjacent to each other around the circumference. The vane assembly 70, 1370 may further include at least one sensor 1380 and a controller 1390 that function similarly to the sensor 1180 and controller 1190 described above.

FIG. 19 illustrates an exemplary bladed rotor assembly 10, 1410 that may utilize any of the airfoils 16, 116, 216, 316, 416, 516, 616, 716, 816, 916, 1016 described above. The bladed rotor assembly 10, 1410 may include an inner wheel 1412 configured to rotate around the central axis 11 of the gas turbine engine 110. The plurality of airfoils 16, 116, 216, 316, 416, 516, 616, 716, 816, 916, 1016 are formed as blades 1416 of the bladed rotor assembly 10, 1410 that extend radially outwardly from the wheel 1412. The blades may attach to the wheel 1412 via the root 1423 of the blade, and each blade may also have a blade tip 1421. In the example illustrated in FIG. 17, the blade may include a cavity 1422, a plurality of pegs 1428 similar to the pegs 28 described above, and a magnetorheological fluid 1430.

The bladed rotor assembly 10, 1410 further includes an outer ring 1442 configured to support a plurality of electromagnets 1440 and arranged radially outward of the blades 1416. In some embodiments, the electromagnets 1440 are spaced apart circumferentially around the ring 1442. The bladed rotor assembly 10, 1410 may further include at least one sensor 1480 and a controller 1490 that function similarly to the sensor 1180 and controller 1190 described above.

Figure 20:
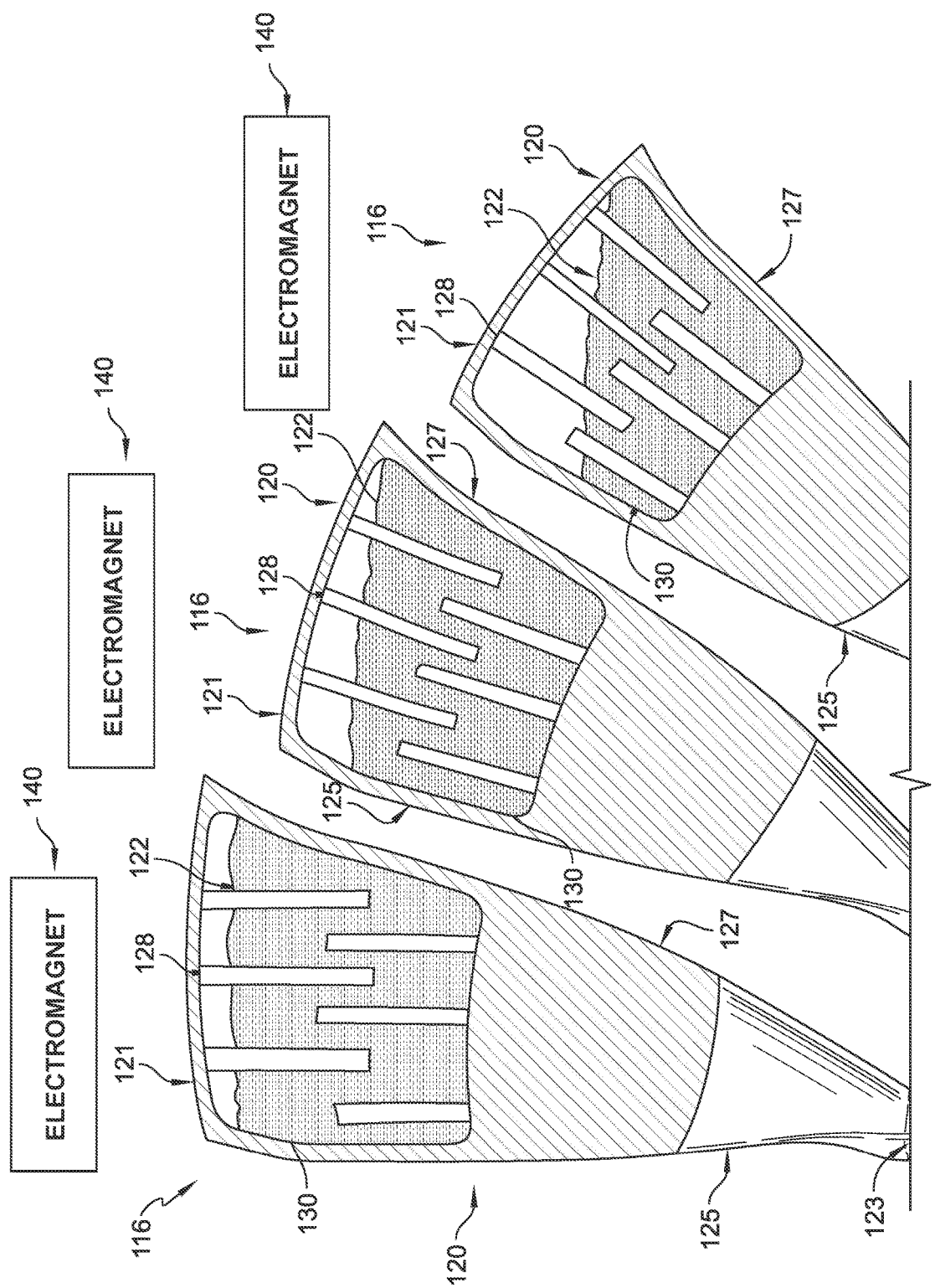
FIG. 20 is a cross-sectional view of a plurality of the airfoils of FIG. 4 showing that adjacent airfoils include the same obstructing member and differing levels of magnetorheological fluid in their respective cavities.

An example of a combination of airfoils assembled so as to be circumferentially spaced apart from each other is shown in FIG. 20. In the illustrative embodiment, the airfoil assembly includes at least three airfoils 116. The airfoils 116 are each formed identically to include the same cavity 122, and the same plurality of radially extending walls 128, as described above. The airfoils 116 each include a differing amount of magnetorheological fluid 130 disposed in the cavities 122, as shown in FIG. 18. The differing amounts of fluid 130 provide mistuning of the adjacent airfoils 116 without compromise of the aerodynamic definition of the blades. Such mistuning is especially beneficial in embodiments in which the airfoils 116 are utilized in a bladed rotor assembly. Although this embodiment includes the airfoil 116, any of the airfoils 16, 116, 216, 316, 416, 516, 616, 716, 816, 916, 1016 described above may be arranged in a similar manner.

In other embodiments, the airfoils may alternate between a first airfoil 116 including the cavity 122, the plurality of radially extending walls 128, and the fluid 130, as described above, and a second airfoil 116 in which the cavity 122 is filled with epoxy putty. This arrangement will also provide mistuning of the adjacent airfoils 116. In some embodiments, a first airfoil 116 may include a cavity 122 filled with the magnetorheological fluid 130, while an adjacent second airfoil 116 may include a cavity 122 filled with a shear-thickening fluid that thickens when the airfoil 116 vibrates, which would provide a similar effect as the thickened magnetorheological fluid. In an additional embodiment, a rotor assembly may be mistuned to mitigate flutter by actively shifting the frequency/response on alternating airfoils.

A further example of a combination of airfoils assembled so as to be circumferentially spaced apart from each other is shown in FIG. 21. In the illustrative embodiment, the airfoil assembly includes at least three airfoils 16, 116, 216. The airfoils 16, 116, 216 are each formed identically to include the same cavity 22, 122, 222 and the same amount of magnetorheological fluid 30, 130, 230 as described above. The airfoils 16, 116, 216 each include a different type of obstructing member 28, 128, 228, as shown in FIG. 19. For example, the first airfoil 116 includes the plurality of radially extending walls 128, the second airfoil 16 includes the plurality of pegs 28, and the third airfoil 216 includes the plurality of angled walls 228. The differing obstructing members 28, 128, 228 provide mistuning of the adjacent airfoils 16, 116, 216 without compromise of the aerodynamic definition of the blades. Such mistuning is especially beneficial in embodiments in which the airfoils 16, 116, 216 are utilized in a bladed rotor assembly. In other embodiments, the electromagnets 40, 140, 240 may be configured, either individually or via a controller similar to the controller 1190 described above, to generate differing magnetic fields around the circumference of the airfoil assembly. Although this embodiment includes the airfoils 16, 116, 216, any of the airfoils 16, 116, 216, 316, 416, 516, 616, 716, 816, 916, 1016 described above may be arranged in a similar manner.

Figure 22:
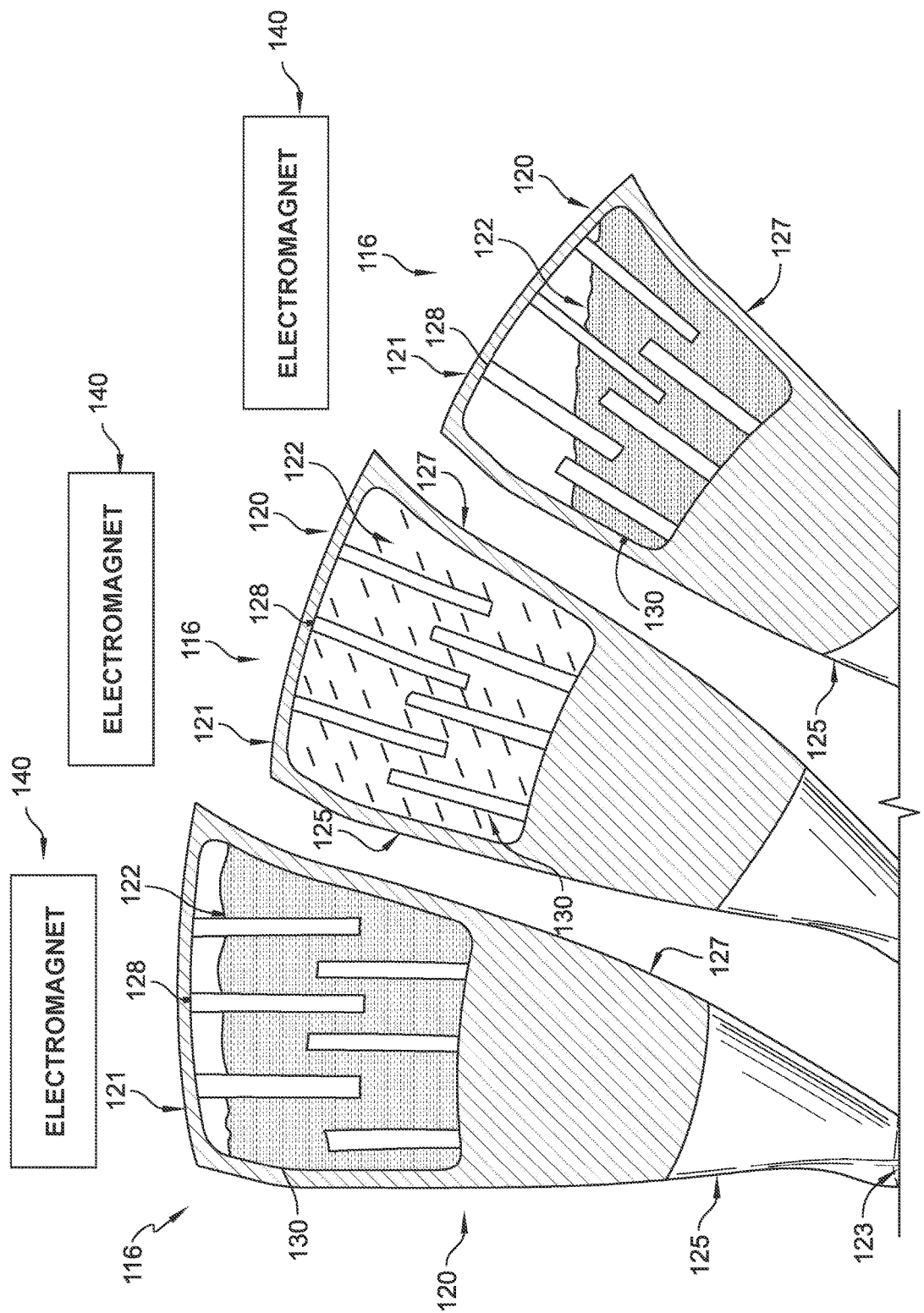
FIG. 22 is a cross-sectional view of a plurality of the airfoils of FIG. 4 showing that a first airfoil includes magnetorheological fluid in its respective cavity and an adjacent second airfoil includes an epoxy material filling the entirety of its respective cavity.

A further example of a combination of airfoils assembled so as to be circumferentially spaced apart from each other is shown in FIG. 22. In the illustrative embodiment, the airfoil assembly includes at least three airfoils 116. The airfoils 116 are each formed identically to include the same cavity 122 as described above. A first airfoil 116 includes the magnetorheological fluid 130 inside the cavity 122, while an adjacent second airfoil 116 includes an epoxy putty material filling the cavity 122. An airfoil assembly may include alternating airfoils 116 of airfoils 116 filled with magnetorheological fluid 130 and epoxy putty in the cavities 122. Although this embodiment includes the airfoils 116, any of the airfoils 16, 116, 216, 316, 416, 516, 616, 716, 816, 916, 1016 described above may be arranged in a similar manner.

A method according to another aspect of the present disclosure includes a first operation of providing an airfoil including an airfoil body extending radially outwardly relative to an axis and configured to interact with gases surrounding the airfoil body, the airfoil body having a leading edge, a trailing edge opposite the leading edge, a pressure side, and a suction side opposite the pressure side. The method further includes a second operation of forming a cavity within the airfoil body and a third operation of filling the cavity with a magnetorheological fluid.

The method includes a fourth operation of arranging at least one obstructing member within the cavity that is configured to obstruct movement of the magnetorheological fluid within the cavity. The method includes a fifth operation of providing at least one electromagnet proximate to the airfoil that is configured to generate a first magnetic field and a second magnetic field different than the first magnetic field, wherein the first magnetic field causes the magnetorheological fluid to have a first viscosity, wherein the second magnetic field causes the magnetorheological fluid to have a second viscosity, wherein the second viscosity is greater than the first viscosity.

The method further includes a sixth operation of generating the second magnetic field via the at least one electromagnet in response to the airfoil operating in a first operating condition that causes at least one of an aeromechanical response and vibrations in the airfoil. The at least one obstructing member is configured to obstruct movement of the magnetorheological fluid within the cavity in response to the magnetorheological fluid having the second viscosity so as to dampen vibrations of the airfoil and reduce negative effects of a dynamic response of the airfoil.

The embodiments described herein provide mode attenuation without changing the aerodynamic shape of the airfoil 16, 116, 216, 316, 416, 516, 616, 716, 816, 916, 1016. The design space on the interior of the airfoil 16, 116, 216, 316, 416, 516, 616, 716, 816, 916, 1016 is such that the cavity, internal features, and attributes of the magnetorheological fluid can be tailored for a particular application, inlet, mission condition, or mode shape. The airfoil 16, 116, 216, 316, 416, 516, 616, 716, 816, 916, 1016 described above would potentially reduce weight while increasing HCF capability in a difficult environment by increasing damping with active control. The pegs, ridges, and walls described above could be machined as part of the airfoil pressure and suction side panels, while the mesh grid or perforated sheet metal may be produced as a separate layer or membrane to be inserted or combined with the pressure and suction side panels. The location of the cavity could be tailored for particular modes of interest or challenges from the inlet distortion. With different fluid design, protrusions, locations and other variations, there would be significant ability to tune design to suit various applications. It may be possible to have a mesh at the center of the chord and then pegs or baffles at ends, etc. The density and/or viscosity could be tuned for different regions as well.

In the embodiments described above with regard to the airfoils 16, 116, 216, 316, 416, 516, 616, 716, 816, 916, 1016, 1116, 1216, the embodiments that include obstructing members that obstruct chord-wise motion of the magnetorheological fluid are most suitable for responding to torsion or twisting motion of the airfoil 16, 116, 216, 316, 416, 516, 616, 716, 816, 916, 1016, 1116, 1216 about a central axis of the airfoil that extends radially. The embodiments that include obstructing members that obstruct through-thickness motion of the magnetorheological fluid are most suitable for responding to flap or bending motion of the airfoil 16, 116, 216, 316, 416, 516, 616, 716, 816, 916, 1016, 1116, 1216 about a central axis of the airfoil that extends in a direction from the leading edge to the trailing edge.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An airfoil assembly for use in a gas turbine engine, the airfoil assembly comprising
   at least one airfoil including an airfoil body extending radially outwardly relative to an axis and configured to interact with gases surrounding the airfoil body, the airfoil body having a leading edge, a trailing edge opposite the leading edge, a pressure side, and a suction side opposite the pressure side, the airfoil body formed to define a cavity within the airfoil body, the cavity being defined by a radially outer top surface, a radially inner bottom surface, a first inner side surface, a second inner side surface, a pressure side surface, and a suction side surface the airfoil body including a magnetorheological fluid disposed within the cavity, the at least one airfoil further including at least one obstructing member arranged within the cavity and configured to obstruct movement of the magnetorheological fluid within the cavity, and
   at least one electromagnet configured to generate a first magnetic field and a second magnetic field different than the first magnetic field, wherein the first magnetic field causes the magnetorheological fluid to have a first viscosity, wherein the second magnetic field causes the magnetorheological fluid to have a second viscosity, wherein the second viscosity is greater than the first viscosity, wherein the at least one electromagnet is configured to generate the second magnetic field in response to the airfoil operating in a first operating condition that causes at least one of an aeromechanical response and vibrations in the airfoil,
   wherein the at least one obstructing member is configured to obstruct movement of the magnetorheological fluid within the cavity in response to the magnetorheological fluid having the second viscosity so as to dampen vibrations of the airfoil and reduce negative effects of a dynamic response of the airfoil.

2. The airfoil assembly of claim 1, wherein the at least one obstructing member includes a plurality of pegs that each extend from the pressure side surface to the suction side surface of the cavity.

3. The airfoil assembly of claim 2, wherein the plurality of pegs includes at least two rows of pegs, each row including at least two pegs, wherein each row of pegs of the at least two rows of pegs extends from the leading edge to the trailing edge in a direction generally perpendicular to the leading edge and the trailing edge, wherein each row of pegs of the at least two rows of pegs is spaced apart from an adjacent row of pegs in a radially direction.

4. The airfoil assembly of claim 1, wherein the at least one obstructing member includes a plurality of radially extending walls, the plurality of radially extending walls including at least one first wall that extends radially outwardly away from the radially inner bottom surface towards the radially outer top surface of the cavity, the at least one first wall extending partway from the radially inner bottom surface towards the radially outer top surface of the cavity, the plurality of radially extending walls further including at least one second wall that extends radially inwardly away from the radially outer top surface towards the radially inner bottom surface of the cavity, the at least one second wall extending partway from the radially outer top surface towards the radially inner bottom surface of the cavity.

5. The airfoil assembly of claim 4, wherein the at least one first wall extends generally perpendicularly away from the radially inner bottom surface of the cavity and the at least one second wall extends generally perpendicularly away from the radially outer top surface of the cavity, wherein each wall of the at least one first wall and the at least one second wall includes a terminal end, wherein the plurality of radially extending walls alternate between the at least one first wall and the at least one second wall in a direction from the leading edge to the trailing edge, and wherein each wall of the at least one first wall extends radially beyond a terminal end of an adjacent second wall of the at least one second wall.

6. The airfoil assembly of claim 1, wherein the at least one obstructing member includes a plurality of angled walls, the plurality of angled walls including at least one first angled wall that extends away from the first inner side surface of the cavity towards the radially inner bottom surface and the second inner side surface, the at least one first angled wall extending at a first angle relative to the first inner side surface and extending partway from the first inner side surface of the cavity towards the radially inner bottom surface and the second inner side surface, the plurality of angled walls further including at least one second angled wall that extends away from the second inner side surface of the cavity towards the radially outer top surface and the first inner side surface, the at least one second angled wall extending at the first angle relative to the second inner side surface and extending partway from the second inner side surface of the cavity towards the radially outer top surface and the first inner side surface such that each first angled wall is parallel to each second angled wall.

7. The airfoil assembly of claim 6, wherein each angled wall of the at least one first angled wall and the at least one second angled wall includes a terminal end, wherein the plurality of angled walls alternate between the at least one first angled wall and the at least one second angled wall in a direction from the radially inner bottom surface to the radially outer top surface of the cavity, and wherein each angled wall of the at least one first angled wall extends beyond a terminal end of an adjacent second angled wall of the at least one second angled wall.

8. The airfoil assembly of claim 1, further comprising:
at least one of (i) a rotor assembly including a wheel configured to rotate about the axis and the at least one airfoil extending radially outward from the wheel, and (ii) a vane assembly including at least one inner platform, at least one outer platform, and the at least one airfoil arranged between the at least one inner platform and the at least one outer platform,
wherein the at least one electromagnet is arranged radially outward of the at least one airfoil.

9. The airfoil assembly of claim 1, further comprising:
at least one of (i) a rotor assembly including a wheel configured to rotate about the axis and the at least one airfoil extending radially outward from the wheel, and (ii) a vane assembly including at least one inner platform, at least one outer platform, and the at least one airfoil arranged between the at least one inner platform and the at least one outer platform,
wherein the at least one electromagnet is arranged radially inward of the at least one airfoil.

10. The airfoil assembly of claim 1, further comprising
at least one sensor configured to determine an operating condition of the airfoil, and
a controller operably connected to the at least one sensor and to the at least one electromagnet,
wherein, in response to the at least one sensor determining that the airfoil is operating in the first operating condition, the controller is configured to instruct the at least one electromagnet to generate the second magnetic field such that the magnetorheological fluid has the second viscosity, and
wherein the first operating condition includes at least one of a predetermined speed of rotation of the airfoil, a predetermined speed of forward travel of the airfoil, a predetermined vibration of the airfoil, and a predetermined distortion level of air flow interacting with the airfoil.

11. A gas turbine engine, comprising
a first airfoil including a first airfoil body extending radially outwardly relative to an axis and configured to interact with gases surrounding the first airfoil body, the first airfoil body having a leading edge, a trailing edge opposite the leading edge, a pressure side, and a suction side opposite the pressure side, the first airfoil body formed to define a first cavity within the first airfoil body, the first airfoil body including a first magnetorheological fluid disposed within the first cavity, and
at least one electromagnet configured to generate a first magnetic field and a second magnetic field different than the first magnetic field, wherein the first magnetic field causes the first magnetorheological fluid to have a first viscosity, wherein the second magnetic field causes the first magnetorheological fluid to have a second viscosity, wherein the second viscosity is greater than the first viscosity, wherein the at least one electromagnet is configured to generate the second magnetic field in response to the first airfoil operating in a first operating condition that causes at least one of an aeromechanical response and vibrations in the first airfoil,
wherein movement within the cavity of the first magnetorheological fluid having the second viscosity dampens vibrations of the first airfoil and reduces negative effects of a dynamic response of the first airfoil, and
wherein the first airfoil further includes at least one first obstructing member arranged within the first cavity, wherein the at least one first obstructing member is configured to obstruct movement of the first magnetorheological fluid having the second viscosity within the first cavity so as to dampen vibrations of the first airfoil and reduce negative effects of a dynamic response of the first airfoil.

12. The gas turbine engine of claim 11, further comprising
at least one rotor assembly including a wheel and a plurality of the first airfoils, the plurality of the first airfoils arranged circumferentially around the wheel, each first airfoil of the plurality of the first airfoils extending radially outwardly from the wheel relative to the axis,
wherein the at least one electromagnet includes at least two electromagnets are arranged within the wheel and are circumferentially spaced apart from each other.

13. The gas turbine engine of claim 11, further comprising
at least one rotor assembly including a wheel and a plurality of the first airfoils, the plurality of the first airfoils arranged circumferentially around the wheel, each first airfoil of the plurality of the first airfoils extending radially outwardly from the wheel relative to the axis, and
an outer ring arranged radially outward of the plurality of the first airfoils, wherein the at least one electromagnet includes at least two electromagnets arranged within the outer ring and circumferentially spaced apart from each other.

14. The gas turbine engine of claim 11, further comprising
at least one vane assembly including a plurality of inner platforms, a plurality of outer platforms, and a plurality of the first airfoils configured as vanes in the at least one vane assembly, the plurality of the first airfoils arranged circumferentially around the axis, each first airfoil of the plurality of the first airfoils extending radially outwardly relative to the axis and extending between a respective inner platform and a respective outer platform,
wherein the at least one electromagnet includes at least two electromagnets arranged radially outward of the plurality of the first airfoils.

15. The gas turbine engine of claim 11, further comprising
at least one vane assembly including a plurality of inner platforms, a plurality of outer platforms, and a plurality of the first airfoils configured as vanes in the at least one vane assembly, the plurality of the first airfoils arranged circumferentially around the axis, each first airfoil of the plurality of the first airfoils extending radially outwardly relative to the axis and extending between a respective inner platform and a respective outer platform,
wherein the at least one electromagnet includes at least two electromagnets arranged radially inward of the plurality of the first airfoils.

16. The gas turbine engine of claim 11, further comprising a second airfoil circumferentially offset from the first airfoil relative to the axis, the second airfoil including
a second airfoil body extending radially outwardly relative to the axis and configured to interact with gases surrounding the second airfoil body, the second airfoil body having a leading edge, a trailing edge opposite the leading edge, a pressure side, and a suction side opposite the pressure side, the second airfoil body formed to define a second cavity within the second airfoil body, the second airfoil body including a second magnetorheological fluid disposed within the second cavity, the second airfoil further including at least one second obstructing member arranged within the second cavity and configured to obstruct movement of the second magnetorheological fluid within the second cavity, wherein the first magnetic field causes the second magnetorheological fluid to have a third viscosity, wherein the second magnetic field causes the second magnetorheological fluid to have a fourth viscosity, wherein the fourth viscosity is greater than the third viscosity, wherein the at least one electromagnet is configured to generate the fourth magnetic field in response to the second airfoil operating in the first operating condition that causes at least one of an aeromechanical response and vibrations in the second airfoil, wherein the at least one second obstructing member is configured to obstruct movement of the second magnetorheological fluid within the cavity in response to the second magnetorheological fluid having the fourth viscosity so as to dampen vibrations of the first airfoil and reduce negative effects of a dynamic response of the first airfoil,
wherein the at least one first obstructing member is different than the at least one second obstructing member so as to mistune adjacent airfoils of the rotor assembly and mitigate flutter of the airfoils.

17. The gas turbine engine of claim 16, wherein the at least one first obstructing member includes a first plurality of walls and the at least one second obstructing member includes a second plurality of walls, wherein the first plurality of walls extend in a first direction, wherein the second plurality of walls extend in a second direction, and wherein the first direction is different than the second direction.

18. The gas turbine engine of claim 16, wherein the first cavity is filled with a first volume of first magnetorheological fluid and the second cavity is filled with a second volume of second magnetorheological fluid, and wherein the first volume is different than the second volume.

19. A method comprising
providing an airfoil including an airfoil body extending radially outwardly relative to an axis and configured to interact with gases surrounding the airfoil body, the airfoil body having a leading edge, a trailing edge opposite the leading edge, a pressure side, and a suction side opposite the pressure side,
forming a cavity within the airfoil body,
filling the cavity with a magnetorheological fluid,
arranging at least one obstructing member within the cavity that is configured to obstruct movement of the magnetorheological fluid within the cavity,
providing at least one electromagnet proximate to the airfoil that is configured to generate a first magnetic field and a second magnetic field different than the first magnetic field, wherein the first magnetic field causes the magnetorheological fluid to have a first viscosity, wherein the second magnetic field causes the magnetorheological fluid to have a second viscosity, wherein the second viscosity is greater than the first viscosity, and
generating the second magnetic field via the at least one electromagnet in response to the airfoil operating in a first operating condition that causes at least one of an aeromechanical response and vibrations in the airfoil, wherein the at least one obstructing member is configured to obstruct movement of the magnetorheological fluid within the cavity in response to the magnetorheological fluid having the second viscosity so as to dampen vibrations of the airfoil and reduce negative effects of a dynamic response of the airfoil.

* * * * *